United States Patent
Ishibashi et al.

(10) Patent No.: US 9,816,640 B2
(45) Date of Patent: Nov. 14, 2017

(54) OIL PRESSURE CONTROL APPARATUS AND METHOD FOR SETTING OIL-PRESSURE CHARACTERISTIC

(71) Applicant: DENSO CORPORATION, Kariya, Aichi-pref. (JP)

(72) Inventors: Ryo Ishibashi, Kariya (JP); Akira Takagi, Obu (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 14/728,207

(22) Filed: Jun. 2, 2015

(65) Prior Publication Data

US 2015/0346738 A1 Dec. 3, 2015

(30) Foreign Application Priority Data

Jun. 3, 2014 (JP) ................. 2014-115266

(51) Int. Cl.
*F16K 31/06* (2006.01)
*G05D 16/20* (2006.01)

(52) U.S. Cl.
CPC ...... *F16K 31/0675* (2013.01); *F16K 31/0613* (2013.01); *G05D 16/202* (2013.01)

(58) Field of Classification Search
CPC ............ F16K 31/0613; F16K 31/0675; G05D 16/202

See application file for complete search history.

(56) References Cited

FOREIGN PATENT DOCUMENTS

| JP | 2009-257395 | 11/2009 |
|----|-------------|---------|
| JP | 2013-24406  | 2/2013  |

*Primary Examiner* — Jacob S Scott
(74) *Attorney, Agent, or Firm* — Nixon & Vanderhye PC

(57) ABSTRACT

In a method for setting a command-response characteristic of an oil pressure control apparatus for each oil temperature, the command-response characteristic actually measured at a reference oil temperature is treated as a reference I-P characteristic. Then, a stroke-response characteristic is calculated based on the reference I-P characteristic, a thrust-force correlation and a restoring-force correlation. An overlapping length and a clearance width of overlapping areas between a sleeve and a spool of the oil pressure control apparatus are estimated based on the reference I-P characteristic and the stroke-response characteristic. Finally, the command-response characteristics for each oil temperature are decided and set based on the overlapping length and the clearance width.

7 Claims, 15 Drawing Sheets

OIL PRESSURE CONTROL APPARATUS AND METHOD FOR SETTING OIL-PRESSURE CHARACTERISTIC

CROSS REFERENCE TO RELATED APPLICATION

This application is based on Japanese Patent Application No. 2014-115266 filed on Jun. 3, 2014, the disclosure of which is incorporated herein by reference.

FIELD OF TECHNOLOGY

The present disclosure relates to an oil pressure control apparatus and a method for setting an oil-pressure characteristic of the oil pressure control apparatus.

BACKGROUND

An oil pressure control device is widely known in the art. In the oil pressure control device, a spool is movably accommodated in a sleeve, so that the spool is reciprocated inside of the sleeve. The sleeve has an inlet port into which working oil is inputted, an outlet port from which the working oil is outputted and a discharge port from which a part of the working oil flowing from the inlet port to the outlet port is discharged. In the oil pressure control device of this kind, an electromagnetic thrust force is generated by a solenoid in accordance with a command value of electric current. The electromagnetic thrust force and an elastic restoring force of an elastic member (a spring) are applied to the spool in an axial direction of the spool. The electromagnetic thrust force and the elastic restoring force are opposed to each other in the axial direction, so that the spool is reciprocated in the sleeve. An amount of the working oil discharged from the discharge port is adjusted in order to control an output oil pressure of the working oil outputted from the outlet port.

For example, Japanese Patent Publication No. 2013-24406 discloses an oil pressure control valve, more exactly, a method for setting a characteristic of an output oil pressure with respect to a command value (equal to electric power supplied to the oil pressure control valve), that is, a command-response characteristic. More exactly, a command-response characteristic at a reference oil temperature is actually measured as a reference characteristic. And the command-response characteristics for each oil temperature are set by use of the reference characteristic.

In the oil pressure control valve, an inlet port, an outlet port and a discharge port, which are formed in a cylindrical wall of a sleeve, are arranged in this order. A spool has several lands arranged in an axial direction thereof, so that each of the lands of the spool is in a sliding contact with an inner peripheral surface of the sleeve, to thereby form interfacial surfaces between an outer peripheral surface of each land and the corresponding inner peripheral surface of the sleeve. In each of the interfacial surfaces, the outer peripheral surface of the spool and the inner peripheral surface of the sleeve are overlapped with each other in a radial direction of the sleeve.

An axial length of an overlapping area in the interfacial surface and a clearance width of the overlapping area in the radial direction have an influence for setting the command-response characteristic. It is difficult to get access from an outside to the interfacial surfaces in the sleeve. However, the above prior art (No. 2018-24406) takes the above influence into consideration. As a result, it is not necessary in the above prior art to actually measure the axial length and the clearance width of the overlapping area, when setting the command-response characteristic for each oil temperature. And thereby, in the above prior art, it is possible to increase productivity of the oil pressure control valves.

However, the inventors of the present disclosure found out, through their researches for setting the command-response characteristic, that the command-response characteristic varies even in a case both of the axial length of the overlapping area and the clearance width in the radial direction are not changed. In addition, the inventors found out that the command-response characteristic varies as a result that an electromagnetic thrust force and an elastic restoring force are inevitably changed because of their tolerances. Accordingly, it was found out that accuracy for setting the command-response characteristic is decreased.

SUMMARY OF THE DISCLOSURE

The present disclosure is made in view of the above problem. It is an object of the present disclosure to provide an oil pressure control apparatus and a method of setting a command-response characteristic of the oil pressure control apparatus, according to which accuracy for setting the command-response characteristic can be increased.

According to a feature of the present disclosure, an oil pressure control apparatus comprises;

a sleeve of a cylindrical shape having an inlet port into which working oil is inputted, an outlet port from which the working oil is outputted and a discharge port from which a part of the working oil passing from the inlet port to the outlet port is discharged, wherein the inlet port, the outlet port and the discharge port are formed in a cylindrical wall of the sleeve in this order in a spring-biasing direction;

a spool movably accommodated in the sleeve and having an inlet-side land and a discharge-side land in this order in the spring-biasing direction, so that an outer peripheral surface of each land of the spool is in a sliding contact with an inner peripheral surface of the cylindrical wall of the sleeve, wherein an inlet-side interfacial surface is formed at an inlet-side overlapping area between the inlet port and the outlet port, so that the outer peripheral surface of the inlet-side land of the spool and the inner peripheral surface of the cylindrical wall are overlapped with each other in a radial direction of the sleeve, and wherein a discharge-side interfacial surface is formed at a discharge-side overlapping area between the outlet port and the discharge port, so that the outer peripheral surface of the discharge-side land of the spool and the inner peripheral surface of the cylindrical wall are overlapped with each other in the radial direction of the sleeve;

a solenoid provided at one of axial ends of the sleeve for generating an electromagnetic thrust force in accordance with a command value of electric power supplied to the solenoid, so that the electromagnetic thrust force is applied to one of axial ends of the spool in an axial direction of the sleeve for biasing the spool in a direction opposite to the spring-biasing direction; and an elastic member provided at the other of the axial ends of the sleeve for generating an elastic restoring force in accordance with a stroke position of the spool with respect to the sleeve, so that the elastic restoring force is applied to the other of the axial ends of the spool in the axial direction of the sleeve for biasing the spool in the spring-biasing direction toward the solenoid, wherein the spool is reciprocated in the sleeve depending on a balance of the electromagnetic thrust force and the elastic restoring force in the axial direction, so as to adjust an amount of the working oil to be discharged from the discharge port to thereby control an output oil pressure of the working oil outputted from the outlet port.

In the oil pressure control apparatus, a method for setting a characteristic of the output oil pressure with respect to the command value as a command-response characteristic comprises;

a first step for actually measuring the command-response characteristic of the output oil pressure at a reference oil temperature, wherein the command-response characteristic actually measured at the reference oil temperature is treated as a reference I-P characteristic;

a second step for calculating a stroke-response characteristic, which is a characteristic of the output oil pressure with respect to the stroke position of the spool, wherein a calculation of the second step is carried out based on the reference I-P characteristic actually measured in the first step, a thrust-force correlation which is a correlation of the electromagnetic thrust force with respect to the stroke position of the spool for each command value, and a restoring-force correlation which is a correlation of the elastic restoring force with respect to the stroke position of the spool;

a third step for estimating an overlapping length and a clearance width based on the stroke-response characteristic calculated in the second step, wherein the overlapping length is a total length of the inlet-side overlapping area formed in the inlet-side interfacial surface and the discharge-side overlapping area formed in the discharge-side interfacial surface in the axial direction of the sleeve, and wherein the clearance width is a width of an inlet-side clearance and a discharge-side clearance each of which is respectively formed in the inlet-side interfacial surface and in the discharge-side interfacial surface in the radial direction of the sleeve; and a fourth step for deciding the command-response characteristic for each oil temperature based on the overlapping length and the clearance width each estimated in the third step as well as the reference I-P characteristic actually measured in the first step.

According to another feature of the present disclosure, the oil pressure control apparatus has an electronic control unit in addition to the above sleeve, the spool, the solenoid and the elastic member. The electronic control unit comprises;

a reference memorizing portion for memorizing a reference I-P characteristic, which is a command-response characteristic of the output oil pressure with respect to the command value and actually measured at a reference oil temperature;

a calculation portion for calculating a stroke-response characteristic of the output oil pressure with respect to the stroke position of the spool, based on the reference I-P characteristic memorized in the reference memorizing portion, a thrust-force correlation which is a correlation of the electromagnetic thrust force with respect to the stroke position for each command value, and a restoring-force correlation which is a correlation of the elastic restoring force with respect to the stroke position;

an estimation portion for estimating an overlapping length and a clearance width based on the stroke-response characteristic calculated in the calculation portion, wherein the overlapping length is a total length of the inlet-side overlapping area formed in the inlet-side interfacial surface and the discharge-side overlapping area formed in the discharge-side interfacial surface in the axial direction of the sleeve, and wherein the clearance width is a width of an inlet-side clearance and a discharge-side clearance each of which is respectively formed in the inlet-side interfacial surface and in the discharge-side interfacial surface in the radial direction of the sleeve; and a decision portion for deciding the command-response characteristic for each oil temperature based on the overlapping length and the clearance width each estimated in the estimation portion as well as the reference I-P characteristic memorized in the reference memorizing portion.

According to the above features of the present disclosure, the characteristic of the output oil pressure with respect to the stroke position of the spool, that is, the stroke-response characteristic is calculated based on the reference I-P characteristic, which corresponds to the command-response characteristic actually measured at the reference oil temperature. In other words, the above stroke-response characteristic is based on not only the thrust-force correlation (which is the correlation of the electromagnetic thrust force with respect to the stroke position for each command value) but also the restoring-force correlation (which is the correlation of the elastic restoring force with respect to the stroke position). As a result, it becomes possible to obtain the stroke-response characteristic, to which tolerance of the electromagnetic thrust force as well as tolerance of the elastic restoring force is reflected.

In addition, since the overlapping length of the overlapping area and the clearance width of the clearance in the interfacial surfaces are estimated based on the stroke-response characteristic, the tolerances of the electromagnetic thrust force and the elastic restoring force can be also reflected to the estimated values for the overlapping length and the clearance width.

Accordingly, when the command-response characteristic for each oil temperature is decided, the actually measured reference I-P characteristic and the exactly-estimated overlapping length and the clearance width based on the stroke-response characteristic are used. It is, therefore, possible to increase the accuracy for setting the command-response characteristic for each oil temperature.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
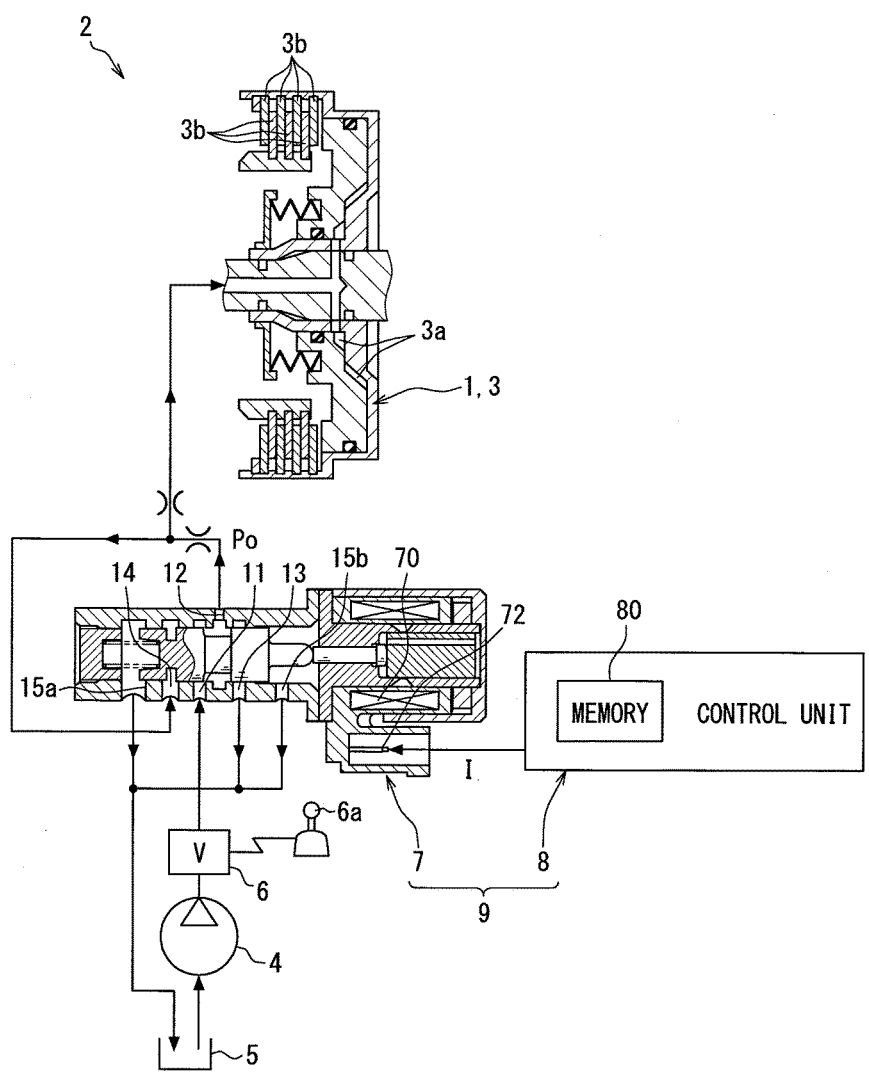
FIG. 1 is a diagram showing an outline of a structure of a control system for an automatic transmission apparatus, to which an oil pressure control apparatus according to a first embodiment of the present disclosure is applied.

The present disclosure will be explained hereinafter by way of multiple embodiments with reference to the drawings. The same reference numerals are given to the same or similar structure and/or portion in order to avoid repeated explanation.

First Embodiment

As shown in FIG. 1, an oil pressure control apparatus 9 according to a first embodiment of the present disclosure is applied to an automatic transmission control system 2 in order to control oil pressure of working oil for an automatic transmission apparatus 1 of a vehicle.

The automatic transmission apparatus 1 is composed of a combination of multiple friction elements 3, such as, a clutch member, a brake member and so on (only one friction element 3 is shown in FIG. 1).

In the automatic transmission apparatus 1, a predetermined number of the friction plates 3b are connected to or disconnected from each other in accordance with the oil pressure of the working oil applied to a piston chamber 3a, to thereby change a range or a transmission gear ratio of the vehicle.

The automatic transmission control system 2 is composed of an oil pump 4, an oil pan 5, a manual valve 6, an oil pressure control valve 7, an electronic control circuit 8, and so on.

The oil pump 4 draws the working oil from the oil pan 5 (working as a drain) and pumps out the working oil to the manual valve 6.

The manual valve 6 is connected to the oil pump 4 and connected to the oil pressure control valve 7, which is provided for every three friction elements 3, although only one friction element 3 is shown in FIG. 1. The manual valve 6 changes a valve position of the respective oil pressure control valves 7 depending on a position of a shift lever 6a operated by a vehicle driver, wherein the working oil is supplied from the oil pump 4 to each of the oil pressure control valves 7.

The oil pressure control valve 7 is an electromagnetically operated spool valve. The oil pressure control valve 7 is operated in accordance with a command value "I" of electric power, which is supplied to the oil pressure control valve 7 as an electric current value. Each of the oil pressure control valves 7 outputs the working oil to be applied to the respective friction elements 3, when the working oil is supplied to the oil pressure control valve 7. The oil pressure control valve 7 controls an output oil pressure "Po" depending on the pressure of the working oil from the oil pump 4 via the manual valve 6.

The electronic control circuit 8, which is mainly composed of a micro-computer having a memory device 80, is electrically connected to each of the oil pressure control valves 7. The electronic control circuit 8 controls the electric current supplied to each of the oil pressure control valves 7 in order to change the transmission gear ratio depending on an operating condition of the vehicle.

In the present embodiment, the oil pressure control apparatus 9 is composed of multiple oil pressure control valves 7 and one common control circuit 8, wherein each of the oil pressure control valves 7 has the same structure to the other oil pressure control valves. Therefore, in FIG. 1, only one of the oil pressure control valves 7 is shown and a further detailed explanation will be made for such one of the oil pressure control valves 7.

Figure 2:
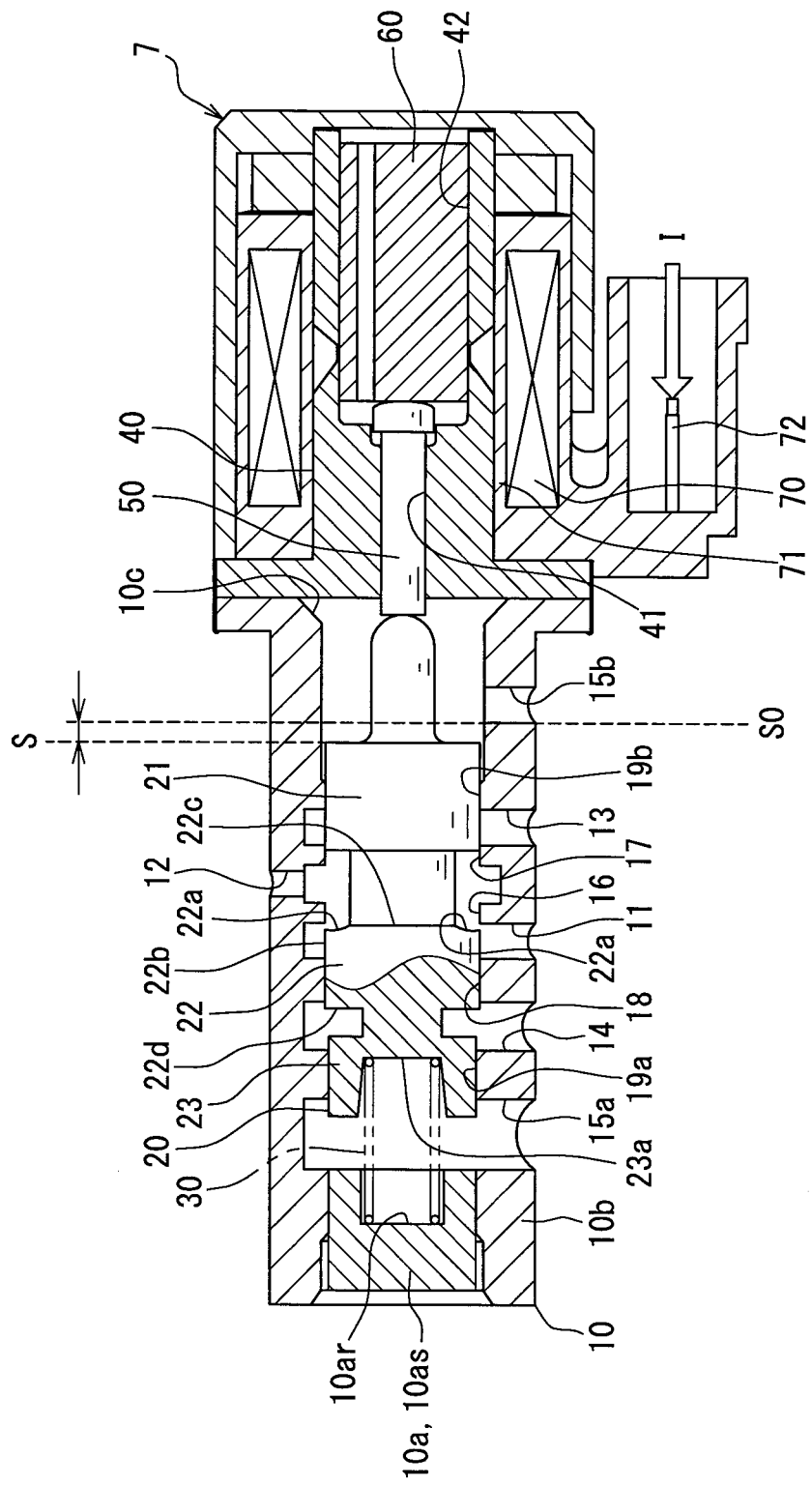
FIG. 2 is a schematically enlarged cross sectional view showing the oil pressure control device of the first embodiment.

As shown in FIG. 2, the oil pressure control valve 7 of the present embodiment is a linear solenoid valve of a normally-closed type. The oil pressure control valve 7 is composed of a sleeve 10, a spool 20, an elastic member 30, a stator 40, a movable shaft 50, a plunger 60, a solenoid 70 and so on.

The sleeve 10, which is made of metal, is formed in a cylindrical shape as a whole. A bottom wall 10a of the sleeve 10 is composed of an adjusting screw 10as, which is threadably inserted into one axial end of a cylindrical wall 10b of the sleeve 10. An inlet port 11, an outlet port 12, a discharge port 13, a feedback port 14 and drain ports 15a and 15b are respectively formed in the cylindrical wall 10b, wherein each of the ports passes through the cylindrical wall 10b in a radial direction.

As shown in FIGS. 1 and 2, the working oil is supplied from the oil pump 4 to the inlet port 11 via the manual valve 6. The outlet port 12 is located at a position of the cylindrical wall 10b opposite to the inlet port 11 in the radial direction of the sleeve 10 to the solenoid 70. The outlet port 12 is located at the position, which is more separated from the bottom wall 10a in an axial direction of the sleeve 10 than the inlet port 11. The working oil, which is controlled at the output oil pressure "Po", is outputted from the outlet port 12 and supplied to the corresponding piston chamber 3a of the automatic transmission apparatus 1.

The discharge port 13 is located at a position of the cylindrical wall 10b opposite to the outlet port 12 in the radial direction of the sleeve 10. The discharge port 13 is located at the position, which is more separated from the bottom wall 10a in the axial direction to the solenoid 70 than the outlet port 12. A part of the working oil flowing from the inlet port 11 to the outlet port 12, that is, an extra amount of the working oil, is discharged from the discharge port 13 to the oil pan 5.

The feedback port 14 is located at a position of the cylindrical wall 10b, which is on a side of the inlet port 11 closer to the bottom wall 10a in the axial direction. The output oil pressure "Po" of the working oil from the outlet port 12 is feed-backed to the feedback port 14, as indicated by arrows in FIGS. 3 and 4.

The drain port 15a is located at a position of the cylindrical wall 10b, which is on a side of the feedback port 14 closer to the bottom wall 10a in the axial direction. The working oil, which is leaked into a space between the feedback port 14 and the bottom wall 10a, is discharged from the drain port 15a to the oil pan 5.

The drain port 15b is located at a position of the cylindrical wall 10b, which is on a side of the discharge port 13 opposite to the inlet port 12 in the axial direction. The working oil, which is leaked into a space between the stator 40 and the discharge port 13, is discharged from the drain port 15b to the oil pan 5.

Figure 3:
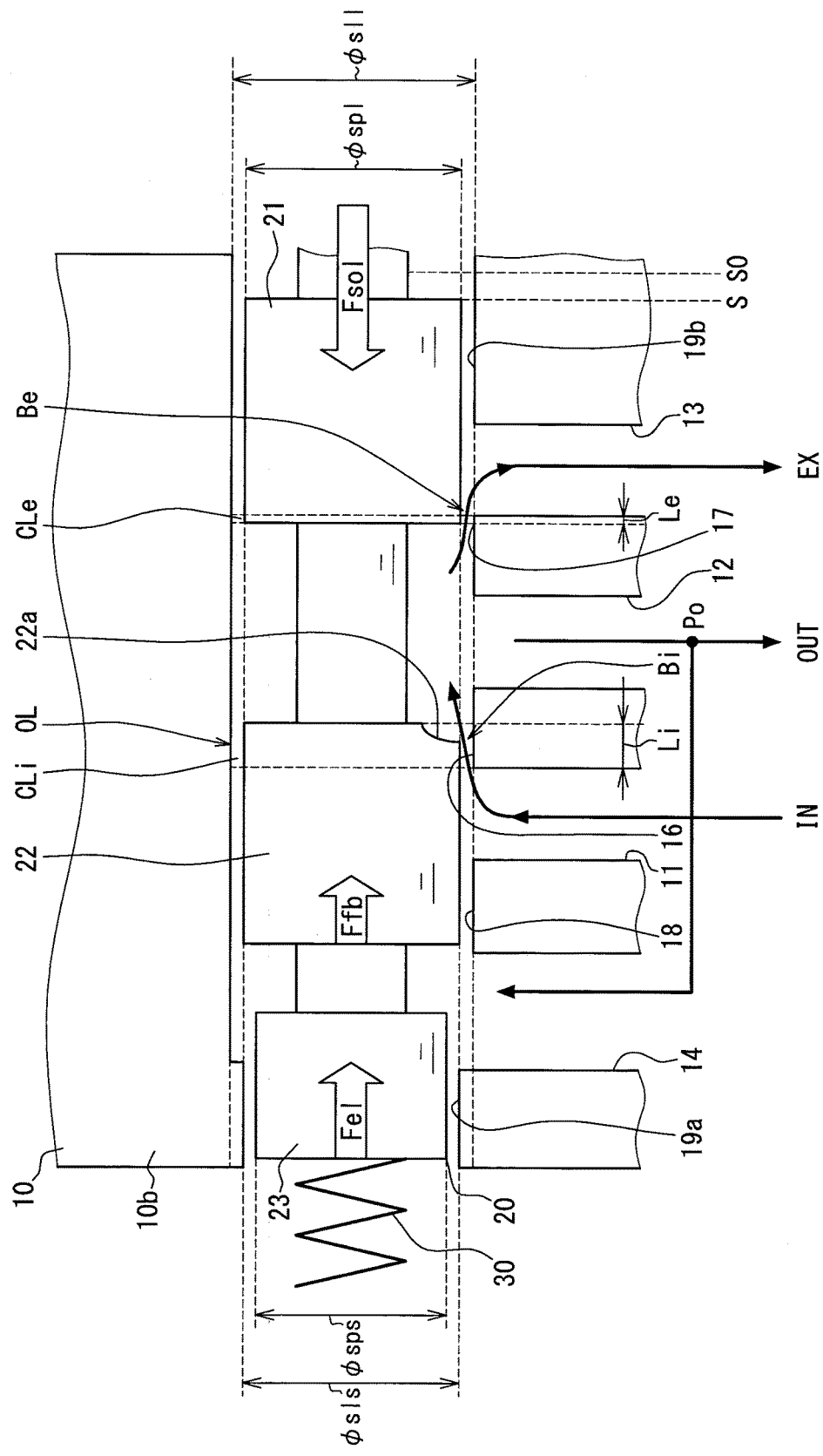
FIG. 3 is a schematic view of the oil pressure control device for explaining an operation thereof, when a stroke position of a sleeve is in a land-overlap range.
Figure 4:
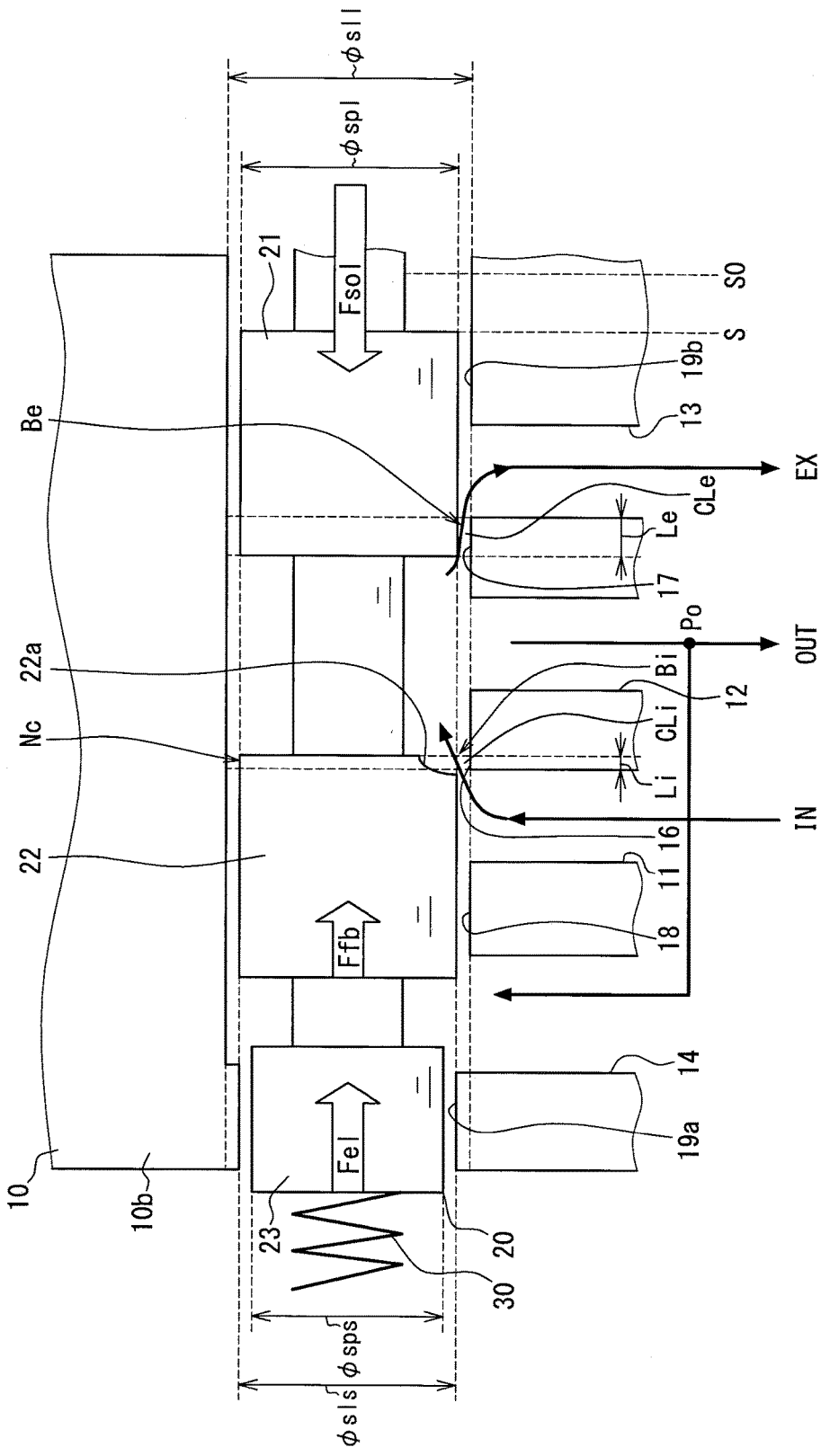
FIG. 4 is also a schematic view of the oil pressure control device for explaining the operation thereof, when the stroke position of the sleeve is in a notch communication range.

As shown in FIG. 2 as well as FIGS. 3 and 4, an inlet-side inner peripheral portion 16 is formed by a part of an inner peripheral surface of the cylindrical wall 10b between the inlet port 11 and the outlet port 12 in the axial direction. In a similar manner, a discharge-side inner peripheral portion 17 is formed by another part of the inner peripheral surface of the cylindrical wall 10b between the outlet port 12 and the discharge port 13 in the axial direction. A feedback-side inner peripheral portion 18 is formed by a further part of the inner peripheral surface of the cylindrical wall 10b between the inlet port 11 and the feedback port 14 in the axial direction. Each of a first and a second drain-side inner peripheral portions 19a and 19b is formed by a still further part of the inner peripheral surface of the cylindrical wall 10b between the feedback port 14 and the drain port 15a and between the discharge port 13 and the drain port 15b in the axial direction.

As shown in FIGS. 3 and 4, each of inner diameters for the respective inner peripheral portions 16, 17, 18 and 19b, except for the first drain-side inner peripheral portion 19a, is set at a value ($\phi$sll), which is substantially identical to one another. An inner diameter ($\phi$sls) of the first drain-side inner peripheral portion 19a is made smaller than the inner diameter ($\phi$sll) of the other inner peripheral portions 16, 17, 18 and 19b.

As shown in FIG. 2, the spool 20, which is made metal, is formed in a cylindrical shape as a whole, wherein the spool 20 has multiple land portions. The spool 20 is coaxially accommodated in the sleeve 10 and movable with respect to the cylindrical wall 10b in the axial direction in a reciprocating manner. In the present embodiment, a stroke position "S" of the spool 20 is indicated by a moving amount of the spool 20, which is moved from a reference position "S0". The reference position "S0" corresponds to a moving end of the spool 20 in the axial direction toward the stator 40.

The spool 20 has a discharge-side land 21, an inlet-side land 22 and a feedback-side land 23 in this order in the axial direction from a side of the stator 40 toward the bottom wall 10a. As shown in FIGS. 3 and 4, each of outer diameters of the discharge-side land 21 and the inlet-side land 22 is set at a value ($\phi$spl), which is substantially equal to each other. An outer diameter ($\phi$sps) of the feedback-side land 23 is made smaller than the outer diameter ($\phi$spl) of the other lands 21 and 22.

As shown in FIG. 2, a right-hand portion of the discharge-side land 21 is always in a sliding contact with the second drain-side inner peripheral portion 19b on the side of the discharge port 13. In addition, in the stroke position "S" of the spool 20, in which the discharge port 13 is out of communication with the outlet port 12, a left-hand portion of the discharge-side land 21 is also in a sliding contact with the discharge-side inner peripheral portion 17.

A left-hand portion of the inlet-side land 22 is always in a sliding contact with the feedback-side inner peripheral portion 18. In addition, in the stroke position "S" of the spool 20, in which the outlet port 12 is out of communication with the inlet port 11, a right-hand portion of the inlet-side land 22 is also in a sliding contact with the inlet-side inner peripheral portion 16 (FIGS. 3 and 4).

The feedback-side land 23 is always in a sliding contact with the first drain-side inner peripheral portion 19a on the side of the feedback port 14.

As shown in FIGS. 3 and 4, a feedback-side oil chamber is formed in the cylindrical wall 10b between the feedback-side land 23 and the inlet-side land 22. Therefore, the output oil pressure "Po", which is feed-backed from the outlet port 12 to the feedback port 14, is applied to the inlet-side land 22 and the feedback-side land 23 at the same time, so that a feedback force "Ffb" is generated in accordance with the output oil pressure "Po". Since the outer diameter "$\phi$spl" of the inlet-side land 22 is larger than the outer diameter "$\phi$sps" of the feedback-side land 23, a pressure receiving area of the inlet-side land 22 is larger than that of the feedback-side land 23. As a result, the spool 20 receives the feedback force "Ffb" and is thereby biased in the axial direction toward the stator 40. Accordingly, a relationship between the feedback force "Ffb" and the output oil pressure "Po" is expressed by the following equation 1, wherein "$\Delta$Ap" is a difference of the pressure receiving area between the lands 22 and 23:

$$Ffb = Po \cdot \Delta Ap \qquad (1)$$

As shown in FIG. 2, notched portions 22a (two notched portions in the present embodiment) are formed at an outer peripheral portion of the inlet-side land 22 on an axial side thereof facing the discharge-side land 21 (that is, on the right-hand portion of the inlet-side land 22). Each of the notched portions 22a is recessed in a radial-inward direction from an outer peripheral surface 22b of the inlet-side land 22. In addition, each of the notched portions 22a is recessed in the axial direction from an axial end surface 22c of the inlet-side land 22. In the present embodiment, a longitudinal length of each notched portion 22a is smaller than that of the inlet-side land 22, so that each notched portion 22a does not reach another axial end surface 22d of the inlet-side land 22 opposite to the axial end surface 22c. The longitudinal length of each notched portion 22a corresponds to a longitudinal length "Lnc" of a notch-communication range "NC", which is formed by the notched portion 22a when the notched portion 22a is opened (explained below).

The elastic member 30 is composed of a coil spring made of metal and formed in a coil shape. The elastic member 30 is coaxially accommodated in the sleeve 10 with the spool 20, so that the elastic member 30 is arranged inside of the cylindrical wall 10b between the bottom wall 10a and the feedback-side land 23 of the spool 20. An elastic restoring force "Fel" is generated due to a compressive deformation of the elastic member 30 in accordance with the stroke position "S" of the spool 20 (FIGS. 3 and 4). When the elastic restoring force "Fel" is applied to the feedback-side land 23, the spool 20 is biased in the axial direction to the stator 40.

Figure 12:
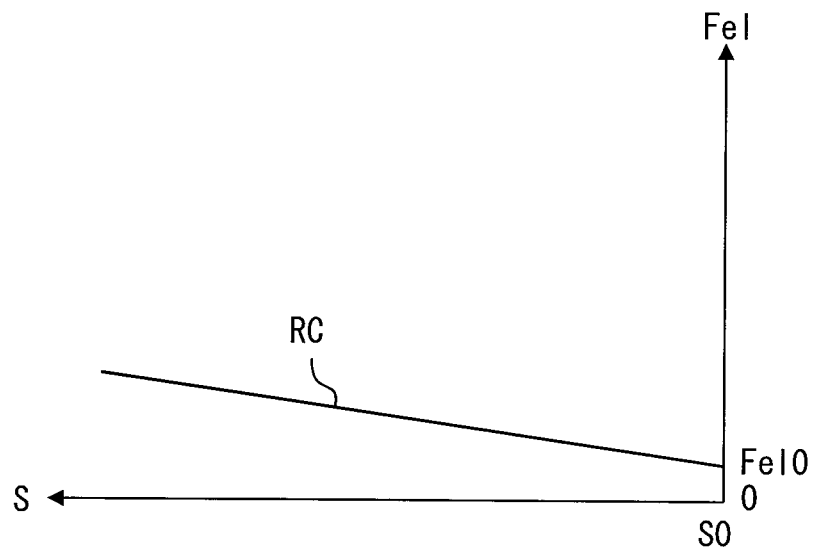
FIG. 12 is a graph showing a characteristic of a restoring-force correlation of the oil pressure control device.

In the present embodiment, a screw amount of the adjusting screw 10as is so adjusted that the elastic member 30 maintains its compressive deformation, even when the spool 20 is moved to its moving end on the side to the stator 40 and the elastic member 30 is fully extended. A spring set load "Fel0", which corresponds to a minimum value of the elastic restoring force "Fel", is set in advance (FIG. 12; explained below).

The stator 40 made of magnetic material is formed in a cylindrical shape. The stator 40 is fixed to the sleeve 10 so as to be coaxial with an opening portion 10c of the cylindrical wall 10b. The stator 40 has a small-diameter through-hole 41 and a large-diameter through-hole 42 at its center. The small-diameter through-hole 41 is formed in the stator 40 on a side to the sleeve 10, while the large-diameter through-hole 42 is formed in the stator 40 on an opposite side to the small-diameter through-hole 41 in the axial direction.

The movable shaft 50 is made of metal and formed in a small-diameter rod shape. The movable shaft 50 is coaxially accommodated in the stator 40, so that the movable shaft 50 is movable in a reciprocating manner with respect to the small-diameter through-hole 41 in the axial direction.

The plunger 60 is made of magnetic material and formed in a rod shape having a diameter larger than that of the movable shaft 50. The plunger 60 is arranged in the stator 40 on a side of the movable shaft 50 opposite to the sleeve 10 in the axial direction. The plunger 60 is coaxially accommodated in the stator 40 and movable in the reciprocating manner with respect to the large-diameter through-hole 42 in the axial direction. In the present embodiment, since the movable shaft 50 is always held in the axial direction between the plunger 60 and the spool 20, which is biased by the elastic restoring force "Fel", the plunger 60 is capable of reciprocating together with the spool 20 and the movable shaft 50.

The solenoid 70 is composed of a bobbin 71 made of resin and a coil wound on the bobbin 71. The coil is arranged at an outer periphery of the stator 40 via the bobbin 71. The solenoid 70 is electrically connected to the electronic control circuit 8 via a terminal 72 shown in FIGS. 1 and 2. The solenoid 70 is energized when it receives the electric current from the electronic control circuit 8 as the command value "I". As shown in FIGS. 3 and 4, the solenoid 70 generates an electromagnetic thrust force "Fsol" in accordance with the command value "I". The electromagnetic thrust force "Fsol" is applied from the plunger 60 to the spool 20 via the movable shaft 50, so that the spool 20 is biased in the axial direction toward the bottom wall 10a. In other words, the spool 20 receives the electromagnetic thrust force "Fsol" in the opposite direction to the elastic restoring force "Fel".

In the present embodiment, the electromagnetic thrust force "Fsol" balances with a sum of the elastic restoring force "Fel" and the feedback force "Ffb", as indicated by the following equation 2, so that the stroke position "S" of the spool 20 is unambiguously decided. As a result, an amount of the working oil discharged from the discharge port 13 is adjusted to a value depending on the stroke position "S" of the spool 20. The output oil pressure "Po" outputted from the outlet port 12 is thereby controlled. The following equation 2 can be rewritten as the following equation 3, when the equation 1 is applied to the equation 2:

$$Fsol = Ffb + Fel \quad \text{(equation 2)}$$

$$Fsol = Po \cdot \Delta Ap + Fel \quad \text{(equation 3)}$$

As shown in FIG. 3, when the stroke position "S" of the spool 20 is close to the reference position "S0", an entire area of the notched portion 22a in the axial direction overlaps with the inlet-side inner peripheral portion 16. In this stroke position "S" of the spool 20, a part of the outer peripheral surface of the inlet-side land 22 (the right-hand portion) is in the sliding contact with the inlet-side inner peripheral portion 16. In addition, a part of the outer peripheral surface of the discharge-side land 21 (the left-hand portion) is in the sliding contact with the discharge-side inner peripheral portion 17.

A land-overlap range "OL" is defined as a longitudinal inner peripheral area of the sleeve 10, in which the entire area of the notched portion 22a in the axial direction overlaps with the inlet-side inner peripheral portion 16. An inlet-side interfacial surface "Bi" is formed in an inlet-side overlapping area, that is, in an area between the outer peripheral surface of the inlet-side land 22 and the inlet-side inner peripheral portion 16 in the radial direction and between the inlet port 11 and the outlet port 12 in the axial direction of the spool 20, when the spool 20 is in the land-overlap range "OL". A longitudinal length "Li" of the inlet-side interfacial surface "Bi" becomes larger when the spool 20 is moved in the direction to the stator 40. A discharge-side interfacial surface "Be" is likewise formed in a discharge-side overlapping area, that is, in an area between the outer peripheral surface of the discharge-side land 21 and the discharge-side inner peripheral portion 17 in the radial direction and between the outlet port 12 and the discharge port 13 in the axial direction of the spool 20, when the spool 20 is in the land-overlap range "OL". A longitudinal length "Le" of the discharge-side interfacial surface "Be" becomes smaller as the spool 20 is more moved in the direction to the stator 40.

As a result, an amount of the working oil, which flows from the inlet port 11 to the outlet port 12 via an inlet-side clearance "CLi" of the inlet-side interfacial surface "Bi", is decreased, as the spool 20 is more moved in the direction to the stator 40. On the other hand, an amount of the working oil, which flows from the inlet port 11 to the discharge port 13 via a discharge-side clearance "CLe" of the discharge-side interfacial surface "Be", is increased, as the spool 20 is more moved in the direction to the stator 40. The output oil pressure "Po" of the working oil outputted from the outlet port 12 is thereby decreased.

The output oil pressure "Po" is expressed by the following equation 4, when the spool 20 is in the land-overlap range "OL":

$$Po = Pi \cdot S / \Sigma L \quad \text{(4)}$$

In the above equation 4, "Pi" is an input oil pressure of the working oil, which is inputted into the inlet port 11. And "ΣL" is a sum of the longitudinal length "Le" and the longitudinal length "Li" for the respective interfacial surfaces "Be" and "Bi" (ΣL=Le+Li). In other words, "ΣL" is a total longitudinal length of the inlet-side and the discharge-side overlapping areas in the interfacial surfaces "Be" and "Bi". Therefore, "ΣL" is also referred to as "an overlapping length".

As shown in FIG. 4, when the spool 20 is moved to the stroke position "S" in the axial direction to the bottom wall 10a, which is more separated from the reference position "S0" than the stroke position "S" of FIG. 3, a part of each notched portion 22a is separated from the inlet-side inner peripheral portion 16. In the stroke position "S" of the spool 20 shown in FIG. 4, the outer peripheral surface of the inlet-side land 22 (the right-hand portion) is in the sliding contact with the inlet-side inner peripheral portion 16 and the outer peripheral surface of the discharge-side land 21 (left-hand portion) is in the sliding contact with the discharge-side inner peripheral portion 17. And the inlet port 11 is communicated to the outlet port 12 via the notched portions 22a.

The notch-communication range "NC" is defined as a longitudinal inner peripheral area of the sleeve 10, in which a part of the notched portion 22a in the axial direction overlaps with the inlet-side inner peripheral portion 16. The notch-communication range "NC" is formed next to the land-overlap range "OL".

The inlet-side interfacial surface "Bi" is also formed between the outer peripheral surface of the inlet-side land 22 and the inlet-side inner peripheral portion 16 in the radial direction and between the inlet port 11 and the outlet port 12 in the axial direction of the spool 20, when the spool 20 is moved from the stroke position "S" in the land-overlap range "OL" (FIG. 3) to the stroke position "S" in the notch-communication range "NC" (FIG. 4). The longitudinal length "Li" of the inlet-side interfacial surface "Bi" becomes smaller when the spool 20 is moved from the land-overlap range "OL" to the notch-communication range "NC".

The discharge-side interfacial surface "Be" is likewise formed between the outer peripheral surface of the discharge-side land 21 and the discharge-side inner peripheral portion 17 in the radial direction and between the outlet port 12 and the discharge port 13 in the axial direction of the spool 20, when the spool 20 is moved from the land-overlap range "OL" to the notch-communication range "NC". Therefore, the longitudinal length "Le" of the discharge-side interfacial surface "Be" becomes larger as the spool 20 is moved more in the direction to the bottom wall 10a.

As a result, the amount of the working oil, which flows from the inlet port 11 to the outlet port 12 via the inlet-side clearance "CLi" of the inlet-side interfacial surface "Bi", is increased, as the spool 20 is more moved in the direction to the bottom wall 10a. On the other hand, the amount of the working oil, which flows from the inlet port 11 to the discharge port 13 via the discharge-side clearance "CLe" of the discharge-side interfacial surface "Be", is decreased, as the spool 20 is more moved in the direction to the bottom wall 10a. The output oil pressure "Po" of the working oil outputted from the outlet port 12 is thereby increased.

The output oil pressure "Po" is expressed by the following equation 5, when the spool 20 is in the notch-communication range "NC":

$$Po = \{-V1 + (V1^2 + 4 \cdot Pi \cdot V1 \cdot \Delta CL^6 \cdot V2/S^2)^{1/2}\} / (2 \cdot \Delta CL^6 \cdot V2/S^2) \quad (5)$$

$$\Delta CL = \phi sll - \phi spl \quad (6)$$

$$V1 = 2 \cdot (Cq \cdot An)^2 / \rho \quad (7)$$

$$V2 = (\pi \cdot \phi spl / 96 \cdot \mu)^2 \quad (8)$$

In the above equation 5, "$\Delta CL$" is a physical amount expressed by the equation 6. In other words, "$\Delta CL$" is a width of the clearances "Cli" and "Cle" in the radial direction (hereinafter, "$\Delta CL$" is also referred to as "a clearance width"). The clearance width "$\Delta CL$" of the inlet-side clearance "CLi" is equal to the clearance width "$\Delta CL$" of the discharge-side clearance "CLe".

Each of "V1" and "V2" in the above equation 5 is a coefficient, which is respectively expressed by the above equations 7 and 8. "Cq", "An" and "ρ" in the equation 7 are, respectively, a flow rate coefficient of the working oil, a minimum opening area in each of the notched portions 22a, and a density of the working oil. "μ" in the equation 8 is a viscosity of the working oil.

As above, the output oil pressure "Po" when the spool 20 in the land-overlap range "OL" and the output oil pressure "Po" when the spool 20 is in the notch-communication range "NC" are respectively obtained by the above equations 4 and 5. As a result, as shown in FIG. 5, a stroke-response characteristic "SP" is obtained as the characteristic of the output oil pressure "Po".

Figure 6:
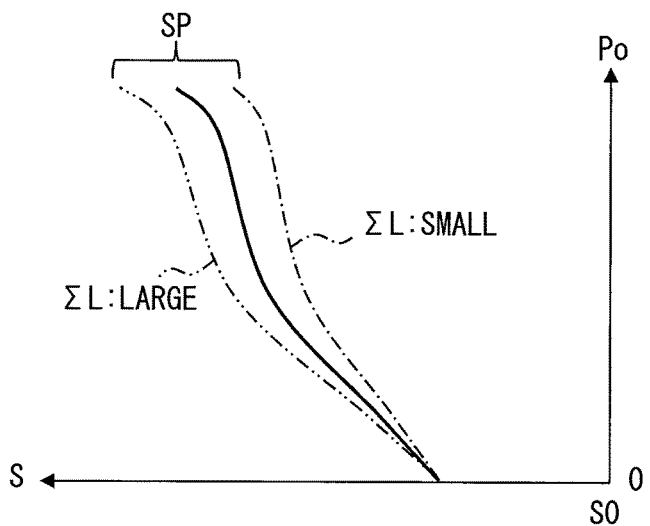
FIG. 6 is a graph for explaining variations of the stroke-response characteristic of FIG. 5.

As shown in FIG. 6, however, the stroke-response characteristic "SP" varies depending on the overlapping length "ΣL", which corresponds to the total longitudinal length of respective overlapping areas in the interfacial surfaces "Bi" and "Be". Each of the interfacial surfaces "Be" and "Bi" is formed between the inlet port 11 and the discharge port 13 in the axial direction, wherein the outlet port 12 is formed between the respective ports 11 and 13. Therefore, when the overlapping length "ΣL" becomes smaller, the output oil pressure "Po" in the land-overlap range "OL" is increased in accordance with the equation 4. A gradient of the stroke-response characteristic "SP" is increased in the land-overlap range "OL".

Figure 5:
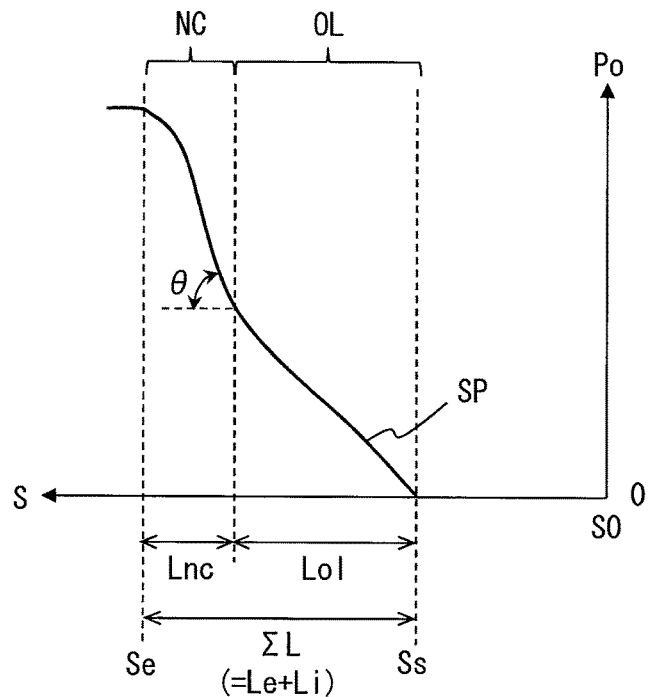
FIG. 5 is a graph showing a stroke-response characteristic of the oil pressure control device.

As shown in FIG. 5, the overlapping length "ΣL" is substantially equal to a sum of a longitudinal length "Lol" of the overlapping area in the land-overlap range "OL" and a longitudinal length "Lnc" of the overlapping area in the notch-communication range "NC" (ΣL=Lol+Lnc).

Figure 7:
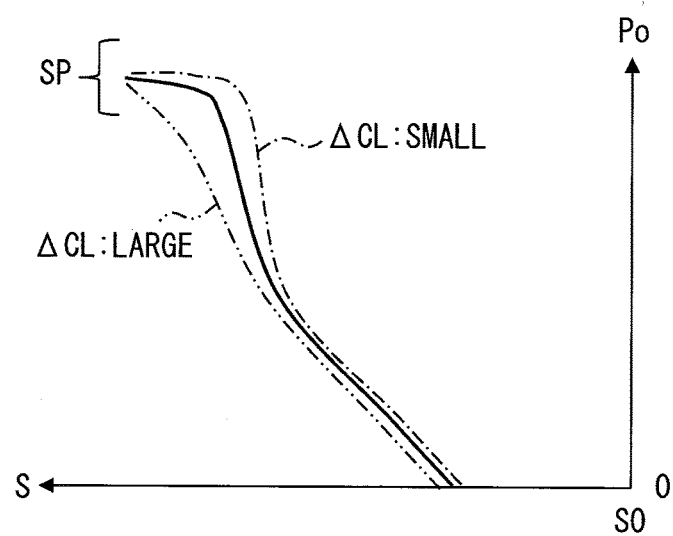
FIG. 7 is another graph for explaining the variations of the stroke-response characteristic of FIG. 5.

As also shown in FIG. 7, the stroke-response characteristic "SP" further varies depending on the clearance width "$\Delta CL$" for the interfacial surfaces "Bi" and "Be". More exactly, when the clearance width "$\Delta CL$" becomes smaller, the output oil pressure "Po" is correspondingly increased in the notch-communication range "NC", in accordance with the equation 5. Therefore, a gradient of the stroke-response characteristic "SP" is increased in the notch-communication range "NC".

Figure 8:
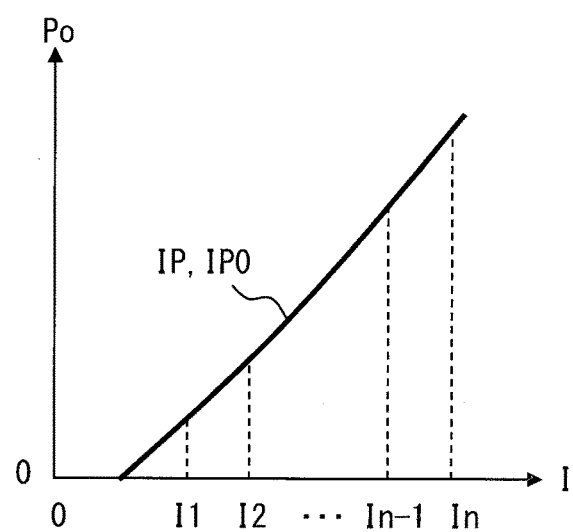
FIG. 8 is a graph showing a reference characteristic for a command-response characteristic of the oil pressure control device according to the first embodiment.

As shown in FIG. 8, in the oil pressure control valve 7 of the present embodiment, the command-response characteristic "IP" is so set that the output oil pressure "Po" is obtained corresponding to each command value "I" (In FIG. 8, the command values "I" are indicated by "I1", "I2", . . . "In−1" and "In").

Figure 9B:
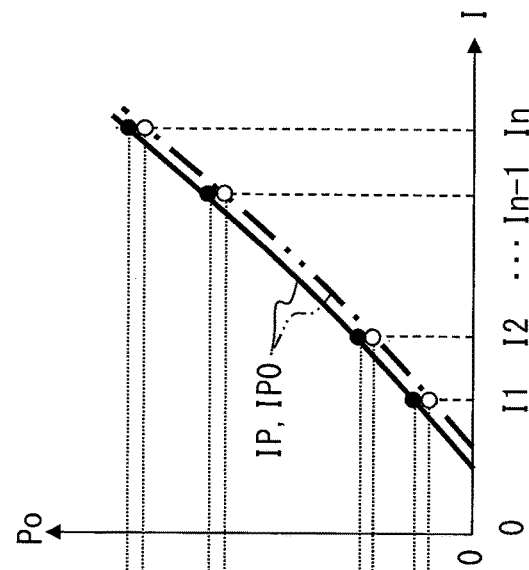
FIGS. 9A and 9B are graphs for explaining a relationship between the command-response characteristic of FIG. 8 and a conversion correlation of FIG. 10, in association with the stroke-response characteristic of FIG. 5.
Figure 9A:
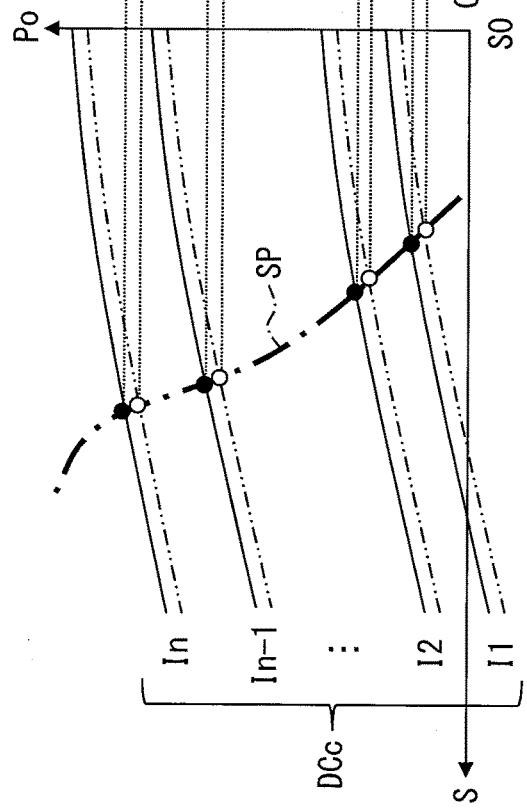

As shown in FIG. 9A, the command-response characteristic "IP" varies depending on the electromagnetic thrust force "Fsol" and/or the elastic restoring force "Fel", even when the stroke-response characteristic "SP" is the same.

Figure 10:
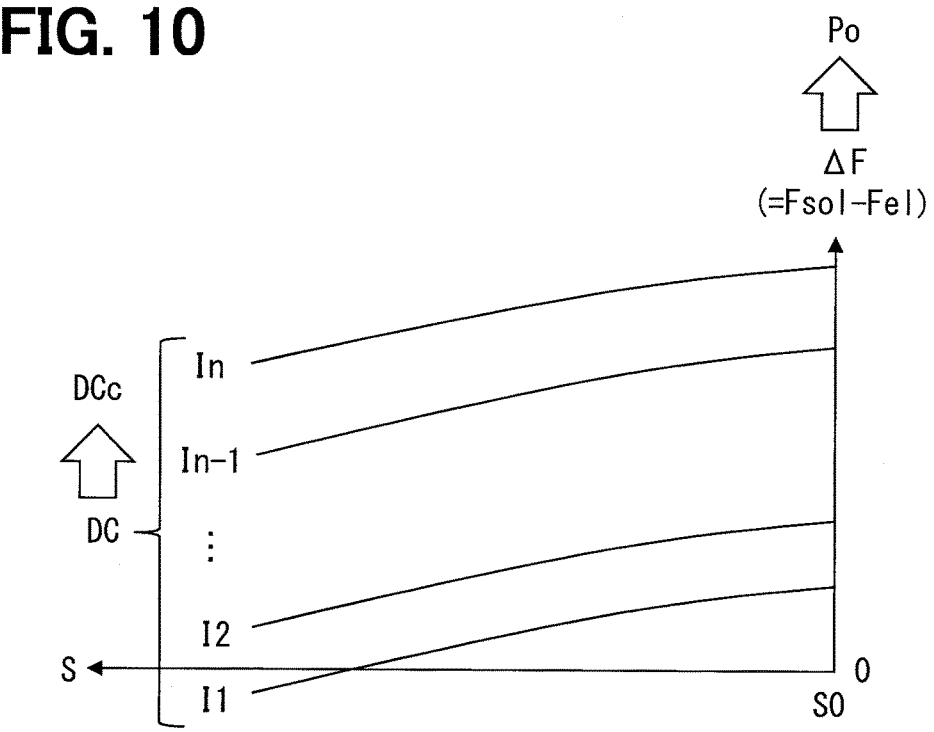
FIG. 10 is a graph showing characteristics of a difference-force correlation and the conversion correlation of the oil pressure control device.

As shown in FIG. 10, a correlation of a difference force "ΔF" with respect to the stroke position "S" for each command value "I" ("I1", "I2", . . . "In−1" and "In" in FIG. 10) is defined as a difference-force correlation "DC". The difference force "ΔF" is a difference between the electromagnetic thrust force "Fsol" and the elastic restoring force "Fel" (ΔF=Fsol−Fel).

Figure 11:
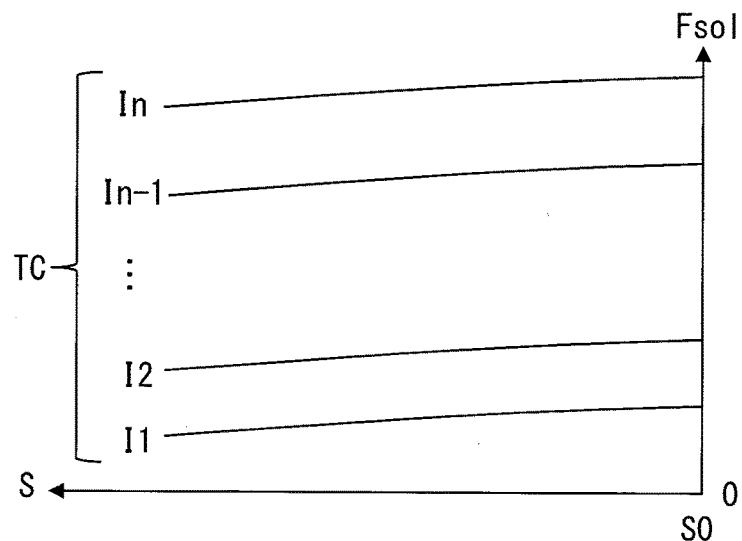
FIG. 11 is a graph showing characteristics of a thrust-force correlation of the oil pressure control device.

In FIG. 11, a correlation of the electromagnetic thrust force "Fsol" with respect to the stroke position "S" for each command value "I" is defined as a thrust-force correlation "TC". A correlation of the elastic restoring force "Fel" with respect to the stroke position "S" is defined as a restoring-force correlation "RC", as shown in FIG. 12. The difference-force correlation "DC" of FIG. 10 is obtained by combining the thrust-force correlation "TC" of FIG. 11 with the restoring-force correlation "RC" of FIG. 12 for each stroke position "S".

As shown in FIG. 10, each value of the difference force "ΔF" of the difference-force correlation "DC" can be converted into the output oil pressure "Po" by use of the equation 3. The output oil pressure "Po" converted from the difference-force correlation "DC" (that is, the correlation of the output oil pressure "Po" with respect to the stroke position "S" for each command value "I") is defined as a conversion correlation "DCc".

The example of FIG. 9A shows the conversion correlation "DCc" and the stroke-response characteristic "SP" with respect to the stroke position "S". In other words, characteristic curves of the conversion correlation "DCc" are overlapped to the stroke-response characteristic "SP" for the same stroke positions "S". In FIG. 9A, solid lines show the conversion correlation "DCc", in a case that each of the electromagnetic thrust force "Fsol" and the elastic restoring force "Fel" has a certain value. On the other hand, two-dot-chain lines show the conversion correlation "DCc", in a case that the output oil pressure "Po" depending on the difference force "ΔF" is changed as a result that at least one of the values of the electromagnetic thrust force "Fsol" and the elastic restoring force "Fel" is changed to a different value from the above certain value of the solid line.

Each of a solid line and a two-dot-chain line of FIG. 9B respectively shows a relationship between the output oil pressure "Po" and the command values "I". More exactly, FIG. 9B shows the command-response characteristics "IP, IP0" at each command values ("I1", "I2", "In−1" and "In"), which corresponds to respective intersecting points of the conversion correlation "DCc" and the stroke-response characteristic "SP" in FIG. 9A.

As understood from the relationship shown in FIG. 9B, since the command-response characteristic "IP" is changed when at least one of the electromagnetic thrust force "Fsol" and the elastic restoring force "Fel" is changed, it is necessary to take the conversion correlation "DCc" into consideration when setting the command-response characteristic "IP".

A process for setting the command-response characteristic "IP" according to the present embodiment will be explained.

Figure 13:
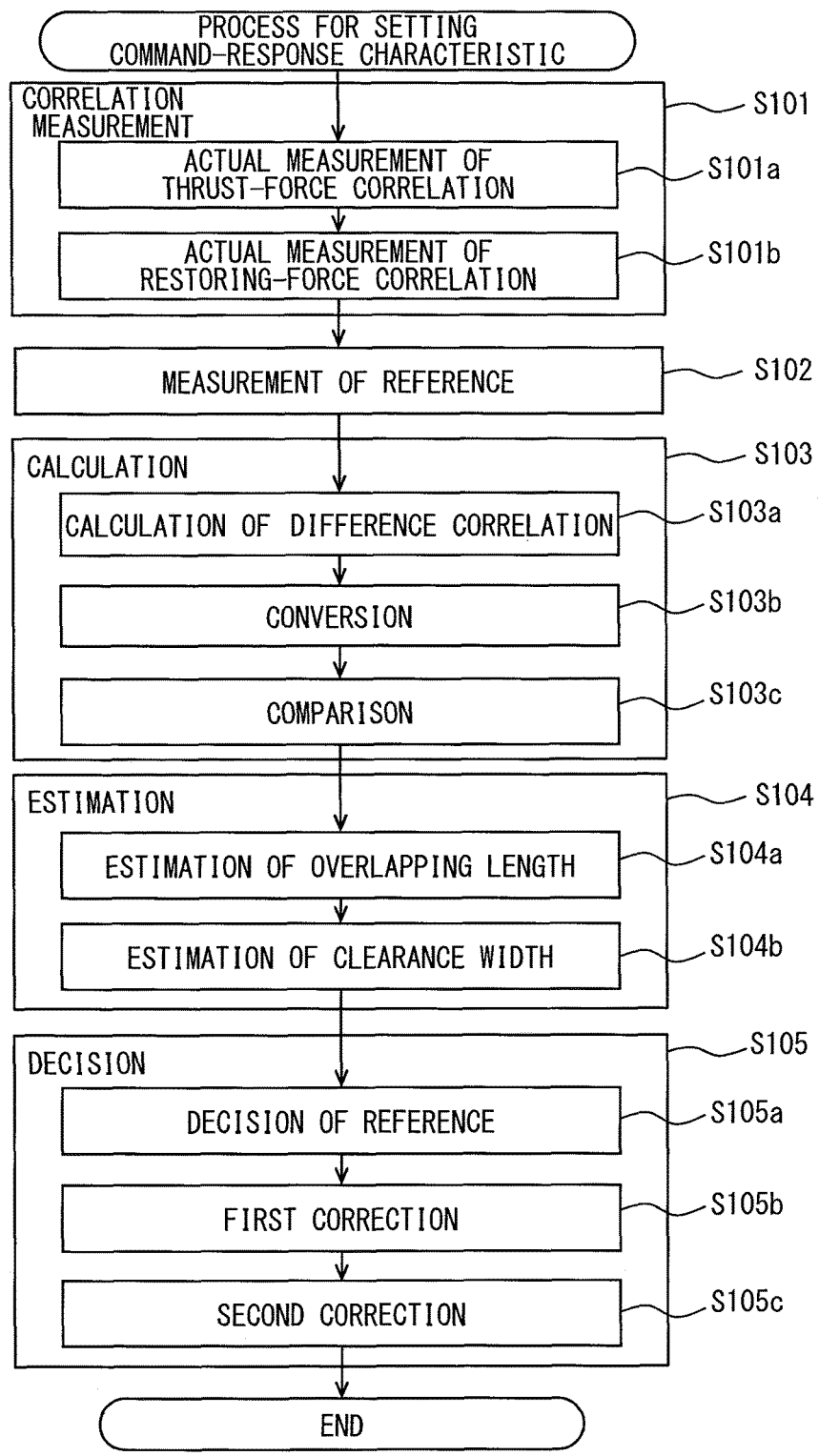
FIG. 13 is a flowchart showing a process for setting the command-response characteristics of the oil pressure control device.

The process for setting the command-response characteristic "IP" according to the present embodiment is carried out in accordance with a flow-chart shown in FIG. 13, for example, before the oil pressure control apparatus 9 is installed in the vehicle.

At a step S101 (a correlation measurement step), the thrust-force correlation "TC" and the restoring-force correlation "RC" are respectively obtained based on actually measured values. More exactly, at a step S101a (a thrust-force correlation measuring step), the thrust-force correlation "TC" is obtained based on the actually measured values of the electromagnetic thrust force "Fsol" for each stroke position "S". In the step S101a, the oil pressure control valve 7 is set to a measuring device 90, as shown in FIG. 14, in a condition that the adjusting screw 10as and the elastic member 30 are removed from the sleeve 10.

Figure 14:
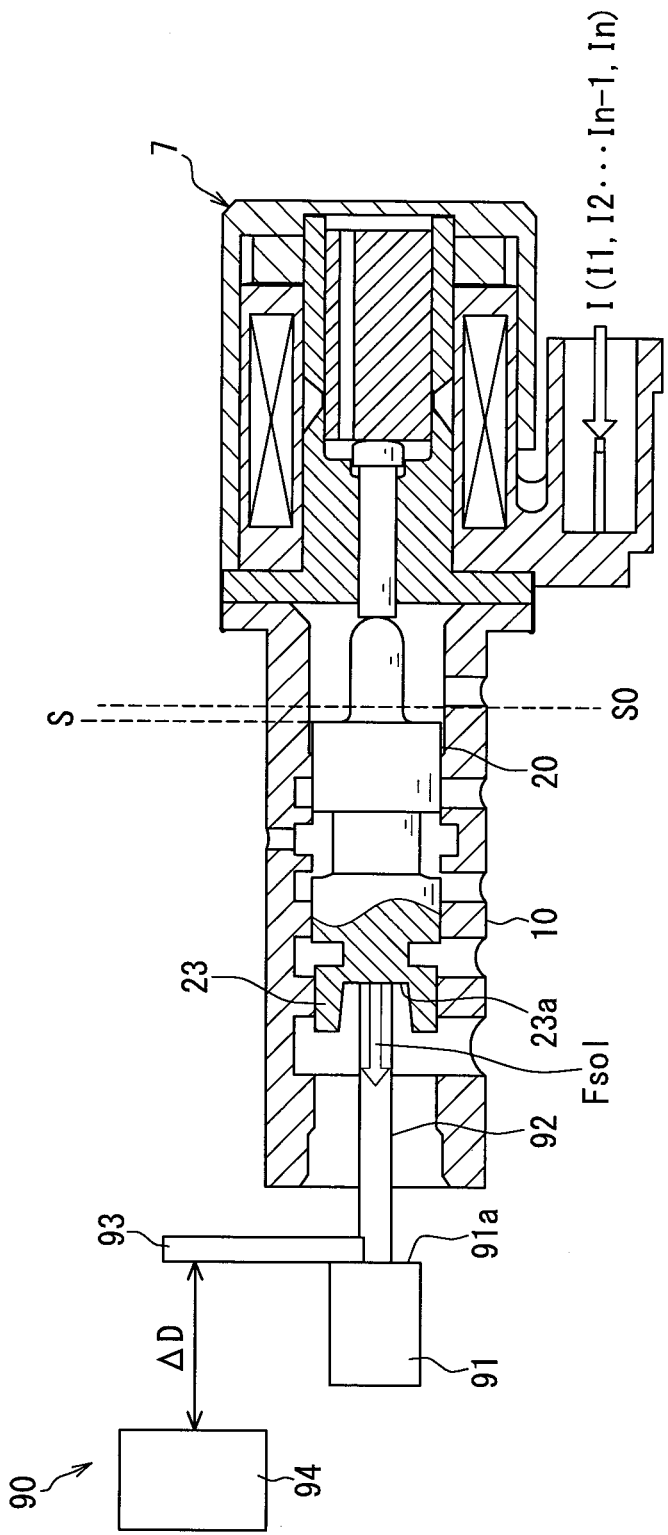
FIG. 14 is a schematic cross sectional view for explaining a process of measuring the thrust-force correlation.

As shown in FIG. 14, the measuring device 90 is composed of a load cell 91, a load transmitting member 92, a range member 93, a measuring sensor 94 and so on. The load cell 91 has a sensing surface 91a for sensing a load, for example, by a strain gauge. The load transmitting member 92 follows a change of the stroke position "S" of the spool 20, so that the load transmitting member 92 is continuously held between the sensing surface 91a and a spring receiving surface 23a of the feedback land 23 (which receives one axial end of the elastic member 30, as shown in FIG. 2). The load transmitting member 92 transmits the electromagnetic thrust force "Fsol" of the spool 20 to the sensing surface 91a. As a result, the electromagnetic thrust force "Fsol", which depends on a position corresponding to the stroke position "S" and which is received by the sensing surface 91a, is measured as a sensed load by the load cell 91. In the present embodiment, the spring receiving surface 23a is formed by a flat surface, which is perpendicular to the axial direction of the spool 20. As a result, the position of the sensing surface 91a exactly corresponds to the stroke position "S".

A position of the range member 93 perpendicular to the axial direction of the spool 20 is maintained when the range member 93 is moved, in order that a contacting condition of the range member 93 with the sensing surface 91a is maintained.

The measuring sensor 94 is composed of, for example, an optical measuring instrument, an acoustic measuring instrument or the like, which measures a distance "ΔD" to the range member 93. Since the position of the range member 93 corresponds to the stroke position "S", the stroke position "S" can be calculated based on the distance "ΔD" measured by the measuring sensor 94.

Referring back to the step S101a of FIG. 13, the electromagnetic thrust force "Fsol" is measured for each measuring point "I1", "I2", . . . "In−1" and "In" (the multiple points are set as the command value "I"), while the stroke position "S" is changed. Accordingly, the correlation of the electromagnetic thrust force "Fsol" with respect to the stroke position "S" for each command value "I", that is, the thrust-force correlation "TC" of FIG. 11 is obtained.

Figure 15:
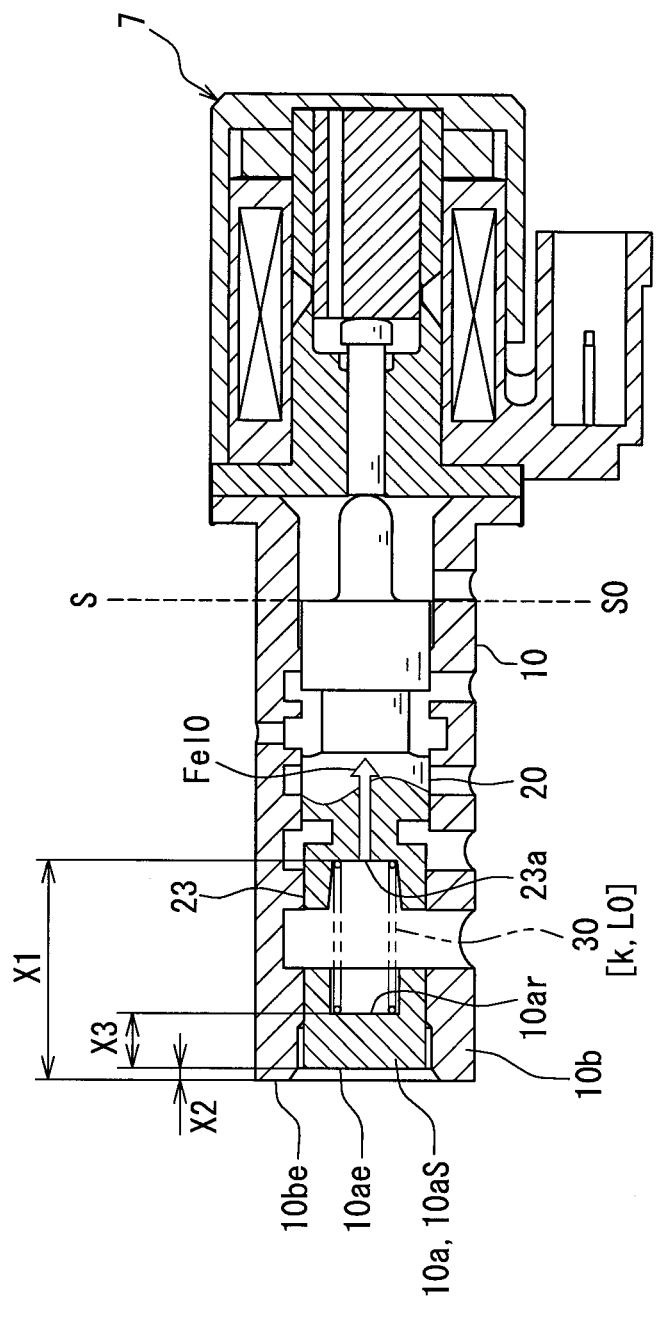
FIG. 15 is a schematic cross sectional view for explaining a process of measuring the restoring-force correlation.

At a step S101b (a restoring-force correlation measuring step) of the correlation measurement step S101, the restoring-force correlation "RC" is obtained based on actually measured values of longitudinal length "X1", "X2" and "X3", when the spool 20 is located in its reference position "S0", as shown in FIG. 15.

The length "X1" is a distance in the axial direction between the spring receiving surface 23a and an outer axial end surface 10be of the cylindrical wall 10b, when the spool 20 is in the reference position "S0".

The length "X2" is a distance in the axial direction between an outer axial end surface 10ae of the adjusting screw 10as and the outer axial end surface 10be of the cylindrical wall 10b, when the spool 20 is in the reference position "S0". The length "X2" corresponds to a screwed amount of the adjusting screw 10as.

The length "X3" is a distance in the axial direction between the outer axial end surface 10ae of the adjusting screw 10as and a spring receiving surface 10ar of the adjusting screw 10as for receiving the other end of the elastic member 30 (FIG. 2). The length "X3" corresponds to a thickness of the adjusting screw 10as (a thickness of the bottom wall 10a). Since each of the outer axial end surface 10ae and the spring receiving surface 10ar of the adjusting screw 10as is formed by a flat surface, which is perpendicular to the axial direction of the spool 20, it is possible to exactly measure the length "X3".

In the present embodiment, the length "X1" and the length "X3" are measured in the condition that the adjusting screw 10as and the elastic member 30 are removed from the sleeve 10. Then, the length "X2" is measured, after the elastic member 30 is accommodated in the sleeve 10 and the adjusting screw 10as is screwed into the sleeve 10.

A relationship of the spring set load "Fel0" of the elastic member 30 with respect to the length "X1", "X2" and "X3" as measured above is expressed by the following equation 9, wherein a constant "k" of spring and a natural length "L0" of the elastic member 30 are used.

$$Fel0 = k \cdot \{L0 - (X1 - X2 - X3)\} \quad (9)$$

The constant "k" of spring and the natural length "L0" are obtained in advance based on an actual measurement, which is carried out when checking specifications of the elastic member 30.

In the restoring-force correlation measuring step S101b, the correlation of the elastic restoring force "Fel" with respect to the stroke position "S", that is, the restoring-force correlation "RC" of FIG. 12 is estimated based on the spring set load "Fel0", which is calculated by use of the constant "k" of spring, the natural length "L0" and the equation (9).

In a step S102 (a reference measurement step) of FIG. 13, which is carried out after the correlation measurement step S101, a reference I-P characteristic "IP0" for the command-response characteristic "IP" is measured at a reference oil temperature "To0" (explained below with reference to FIG. 17A). More exactly, in the oil pressure control valve 7, in which the elastic member 30 is accommodated in the sleeve 10 and the adjusting screw 10as is screwed into the sleeve 10, an ambient air temperature of the oil pressure control valve 7 is maintained at the reference oil temperature "To0". Then, the output oil pressure "Po" is measured for each measuring point "I1", "I2", ... "In−1" and "In" for the command value "I". Accordingly, the correlation of the output oil pressure "Po" with respect to the command value "I", that is, the reference I-P characteristic "IP0" of FIG. 8 is obtained.

In a step S103 (a calculation step) of FIG. 13, which is carried out after the reference measurement step S102, the stroke-response characteristic "SP" is calculated. More exactly, in a step S103a (a difference-force correlation calculating step), the correlation of the difference force "ΔF" with respect to the stroke position "S" is calculated for each command value "I", that is, the difference-force correlation "DC" of FIG. 10 is calculated, based on the thrust-force correlation "TC" and the restoring-force correlation "RC" obtained in the correlation measuring step S101.

In a step S103b (a converting step) of the calculation step S103, the difference force "ΔF" is converted into the output oil pressure "Po" for each difference-force correlation "DC". As a result, the conversion correlation "DCc" of FIG. 10 is obtained.

Figure 16B:
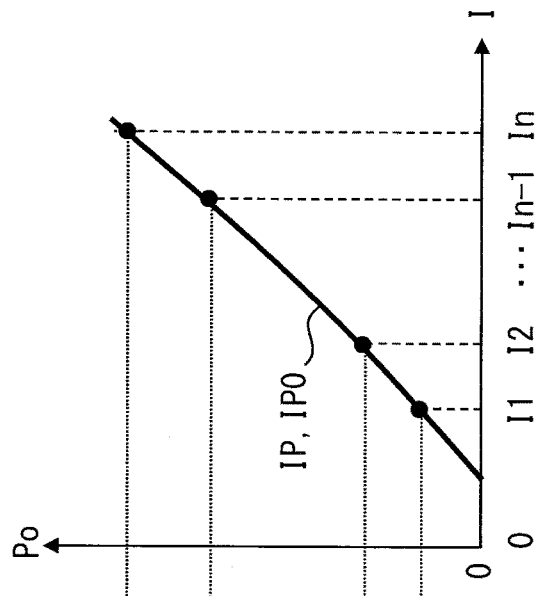
FIGS. 16A and 16B are graphs, similar to FIGS. 9A and 9B, for explaining a comparing step of a calculation step shown in FIG. 13.
Figure 16A:
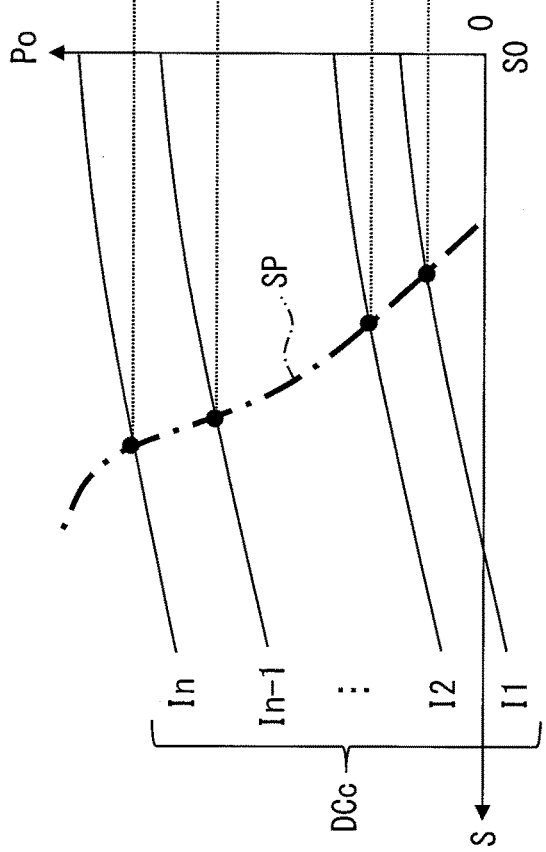

In a step S103c (a comparing step) of the calculation step S103, the conversion correlation "DCc" obtained in the converting step S103b is compared with the reference I-P characteristic "IP0" measured in the reference measurement step S102, as shown in FIGS. 16A and 16B. More exactly, a comparing point is picked out on each conversion correlation "DCc" of FIG. 16A, wherein each comparing point corresponds to the output oil pressure "Po" on the reference I-P characteristic "IP0" of FIG. 16B at each measuring point "I1", "I2", ... "In−1" and "In" of the command value "I". A characteristic line with respect to the stroke position "S", which is obtained by connecting the comparing points, that is, the stroke-response characteristic "SP", is obtained as indicated by a one-dot-chain line in FIG. 16A.

In a step S104 (an estimation step) of FIG. 13, which is carried out after the calculation step S103, the overlapping length "ΣL" and the clearance width "ΔCL" are respectively estimated based on the stroke-response characteristic "SP".

More exactly, in a step S104a (an overlap-length estimating step) of the estimation step S104, a stroke position "S" at which the output oil pressure "Po" becomes zero on the stroke-response characteristic "SP" (which is obtained in the above calculation step S103) is picked out as a starting position "Ss", as shown in FIG. 5. In addition, another stroke position "S" at which the output oil pressure "Po" substantively moves to its steady state is picked out as an ending position "Se". In the stroke-response characteristic "SP", as shown in FIG. 5, the output oil pressure "Po" is more increased as the stroke position "S" is more separated from the starting position "Ss". A distance between the starting position "Ss" and the ending position "Se" corresponds to the total longitudinal length (Lol+Lnc), which is substantially equal to the overlapping length "ΣL". Therefore, in the overlap-length estimating step S104a, the distance between the starting position "Ss" and the ending position "Se" of the stroke-response characteristic "SP" is estimated as the overlapping length "ΣL".

In a step S104b (a clearance-width estimating step) of the estimation step S104, the notch communication range "NC" is picked out on the stroke-response characteristic "SP" (calculated in the calculation step S103), wherein the stroke-response characteristic "SP" in the notch communication range "NC" has a gradient "θ" different from that in the land-overlap range "OL", as shown in FIG. 5. In addition, in the clearance-width estimating step S104b, the gradient "θ" of the stroke-response characteristic "SP" in the notch communication range "NC" is calculated. The gradient "θ" expresses a change rate of the output oil pressure "Po" with respect to the stroke position "S" in the notch communication range "NC". An approximative relation based on the equation 5 is satisfied between the output oil pressure "Po" and the clearance width "ΔCL". As above, in the clearance-width estimating step S104b, the clearance width "ΔCL" is approximately estimated based on the gradient "θ" of the stroke-response characteristic "SP" in the notch communication range "NC".

Figure 17A:
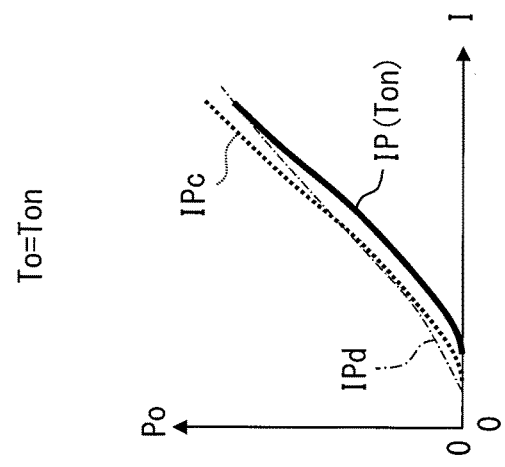
FIGS. 17A, 17B and 17C are characteristic graphs for explaining a deciding step shown in FIG. 13.
Figure 17B:
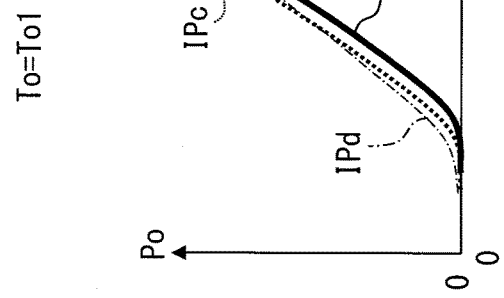
Figure 17C:
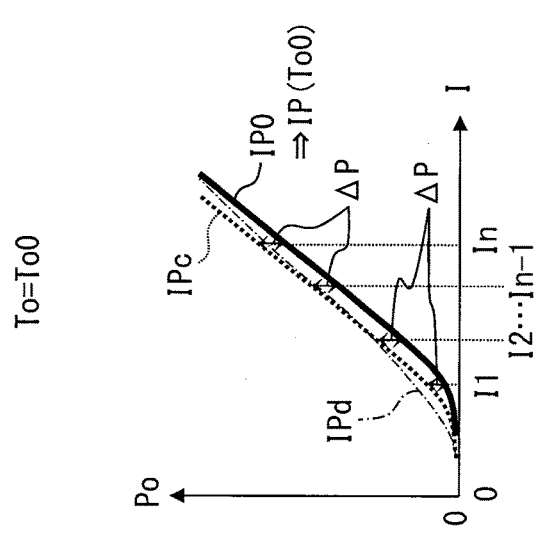

In a step S105 (a decision step) of FIG. 13, which is carried out after the estimation step S104, the command-response characteristic "IP" for each oil temperature "To" is decided based on the overlapping length "ΣL" and the clearance width "ΔCL" (both of which are estimated in the above step S104) as well as the reference I-P characteristic "IP0" (actually measured in the above step S102), as shown in FIGS. 17A to 17C. More exactly, in a step S105a (a reference deciding step) of the decision step S105, the reference I-P characteristic "IP0" actually measured in the reference measurement step S102 is decided as the command-response characteristic at the reference oil temperature "To0", as indicated by a solid line in FIG. 17A.

In FIGS. 17A to 17C, a design characteristic "IPd" which is prepared in advance for the command-response characteristic "IP" is indicated by a one-dot-chain line. In a step S105b (a first correcting step) of the decision step S105, the design characteristic "IPd" is corrected based on the overlapping length "ΣL" and the clearance width "ΔCL", which are estimated in the estimation step S104. The design characteristic "IPd" is prepared by picking out a middle value of a tolerance, which is assumed when designing the oil pressure control apparatus 9 as a whole or designing the oil pressure control valve 7 itself, with respect to the command-response characteristic "IP" for each oil temperature "To" (including the reference I-P characteristic "IP0" at the reference oil temperature "To0"). In the first correcting step S105b, the design characteristic "IPd" for each oil temperature "To" is corrected depending on the overlapping length "ΣL" and the clearance width "ΔCL", which are specific to the individual oil pressure control valve 7. Accordingly, a corrected characteristic "IPc" is obtained for each oil temperature "To", as indicated by a dotted line in FIGS. 17A to 17C.

In a step S105c (a second correcting step) of the decision step S105, the corrected characteristic "IPc" of the above first correcting step S105b (except for the corrected characteristic "IPc" at the reference oil temperature "To0") is further corrected based on the corrected characteristic "IPc" at the reference oil temperature "To0" and the reference I-P characteristic "IP0" actually measured in the reference measuring step S102. More exactly, a deviation "ΔP" of the output oil pressure "Po" between the corrected characteristic "IPc" at the reference oil temperature "To0" and the reference I-P characteristic "IP0" actually measured in the step S102 is calculated at first for each command value "I" ("I1", "I2", ... "In−1" and "In" in FIG. 17A). Then, the corrected characteristic "IPc" at a temperature other than the reference oil temperature "To0" (for example, the corrected characteristic "IPc" at a temperature "To1" as indicated by a dotted line in FIG. 17B, or the corrected characteristic "IPc" at a temperature "Ton" as indicated by a dotted line in FIG. 17C) is shifted by the deviation "ΔP" at the reference oil temperature "To0". Accordingly, the characteristic at the temperature other than the reference oil temperature "To0", for example, as indicated by a solid line in FIG. 17B or 17C (the characteristic at the temperature "To1" in case of FIG. 17B, the characteristic at the temperature "Ton" in case of FIG. 17C) is decided as the command-response characteristic "IP" for the respective oil temperature "To".

The command-response characteristic "IP" decided as above for the respective oil temperature "To" is memorized by hand in the memory device 80 of the control circuit 8 (FIG. 1), for example, when the oil pressure control apparatus 9 is installed in the vehicle. Therefore, the control circuit 8 carries out a variable control for the electric current, which is supplied to the oil pressure control valve 7 as the command value "I" in accordance with the command-response characteristic "IP" memorized in the memory device 80. As a result, the control circuit 8 realizes a desired transmission gear ratio by the output oil pressure "Po" which is controlled depending on an operating condition of the vehicle.

The command-response characteristic "IP" inevitably differs from an individual product to an individual product. Therefore, for example, a bar-code label is attached to each oil pressure control valve 7 and the command-response characteristic "IP" for the oil pressure control valve 7 is read from the bar-code label before the command-response characteristic "IP" is memorized to the memory device 80. The memory device 80 is composed of, for example, one or multiple memory media, such as, EEPROM or the like.

Advantages of the Embodiment

Advantages of the first embodiment will be hereinafter explained.

In the first embodiment, the characteristic of the output oil pressure "Po" with respect to the stroke position "S" of the spool 20, that is, the stroke-response characteristic "SP" is calculated based on the reference I-P characteristic "IP0" actually measured at the reference oil temperature "To0". In this calculation, the stroke-response characteristic "SP" is based on not only the thrust-force correlation "TC" (that is, the correlation of the electromagnetic thrust force "Fsol" with respect to the stroke position "S" for each command value "I") but also the restoring-force correlation "RC" (that is, the correlation of the elastic restoring force "Fel" with respect to the stroke position "S"). As a result, the stroke-response characteristic "SP" can be calculated, in which the respective tolerances for the electromagnetic thrust force "Fsol" and the elastic restoring force "Fel" are reflected.

In addition, since the overlapping length "ΣL" and the clearance width "ΔCL" in the interfacial surfaces "Bi" and "Be" are estimated based on the stroke-response characteristic "SP", the respective tolerances for the electromagnetic thrust force "Fsol" and the elastic restoring force "Fel" can be also reflected in the estimated values for the overlapping length "ΣL" and the clearance width "ΔCL". Therefore, when the command-response characteristic "IP" is decided for each oil temperature "To", not only the reference I-P characteristic "IP0" actually measured but also the exact values for the overlapping length "ΣL" and the clearance width "ΔCL" estimated based on the stroke-response characteristic "SP" are used. It is, therefore, possible to increase the accuracy for setting the command-response characteristic "IP" in the oil pressure control apparatus.

In the first embodiment, the difference force "ΔF" between the electromagnetic thrust force "Fsol" and the elastic restoring force "Fel" coincides with the feedback force "Ffb", which balances with the electromagnetic thrust force "Fsol" and the elastic restoring force "Fel" as a result of the feedback of the output oil pressure "Po".

Accordingly, it is possible to convert the feedback force "Fbb" (which coincides with the difference force "ΔF") into a pressure value of the output oil pressure "Po" from the difference-force correlation "DC", which is obtained as the correlation of the difference force "ΔF" with respect to the stroke position "S" for each command value "I" and which is obtained based on the thrust-force correlation "TC" and the restoring-force correlation "RC". Therefore, it is possible to surely calculate the stroke-response characteristic "SP" by comparing the conversion correlation "DCc" with the reference I-P characteristic "IP0" (which is the correlation of the output oil pressure "Po" for each command value "I"), wherein the conversion correlation "DCc" is the correlation of the output oil pressure "Po" converted from the difference force "ΔF" with respect to the stroke position "S" for each command value "I".

According to the above method, it is possible to calculate the stroke-response characteristic "SP", to which the respective tolerances of the electromagnetic thrust force "Fsol" and the elastic restoring force "Fel" are reflected. It is possible to exactly estimate the overlapping length "ΣL" and the clearance width "ΔCL" based on the stroke-response characteristic "SP". Accordingly, it becomes possible to increase the accuracy for setting the command-response characteristic "IP".

In addition, according to the first embodiment, when the stroke position "S" of the spool 20 in the land-overlap range "OL", the notched portions 22a overlap with the inlet-side inner peripheral portion 16 and the inlet-side land 22 is in the sliding contact with the inlet-side inner peripheral portion 16, while the discharge-side land 21 is in the sliding contact with the discharge-side inner peripheral portion 17. Accordingly, in the land-overlap range "OL", the communication between the outlet port 12 and the inlet port 11 as well as the communication between the outlet port 12 and the discharge port 13 is cut off. As a result, the stroke-response characteristic "SP" varies depending on the overlapping length "ΣL" in the land-overlap range "OL". The overlapping length "ΣL", which is the total length of the inlet-side interfacial surface "Bi" and the discharge-side interfacial surface "Be", is substantially equal to the total length (Lol+Lnc) of the land-overlap range "OL" and the notch communication range "NC". Therefore, it is possible to exactly estimate the overlapping length "ΣL", when the calculation is made based on the total length of the land-overlap range "OL" and the notch communication range "NC" which can be obtained from the stroke-response characteristic "Sp".

On the other hand, when the stroke position "S" of the spool 20 in the notch communication range "NC", the inlet-side land 22 is in the sliding contact with the inlet-side inner peripheral portion 16 but the notched portions 22a are partly separated from the inlet-side inner peripheral portion 16, while the discharge-side land 21 is in the sliding contact with the discharge-side inner peripheral portion 17. Therefore, although the communication between the outlet port 12 and the discharge port 13 is cut off, the inlet port 11 is communicated with the outlet port 12 via the notched portions 22a.

As a result, the stroke-response characteristic "SP" varies depending on the clearance width "ΔCL" of the inlet-side clearance "CLi" and the discharge-side clearance "CLe". Therefore, it is possible to exactly estimate the clearance width "ΔCL", when the calculation is made based on the change rate of the output oil pressure "Po" with respect to the stroke position "S" in the notch communication range "NC", in other words, when the calculation is made based on the gradient "θ" of the stroke-response characteristic "SP".

As above, since the overlapping length "ΣL" as well as the clearance width "ΔCL" can be exactly estimated, it becomes possible to increase the accuracy for setting the command-response characteristic "IP", which is obtained based on those estimated values.

In addition, according to the first embodiment, each of the thrust-force correlation "TC" and the restoring-force correlation "RC", which are used for calculating the stroke-response characteristic "SP", can be obtained based on the respective actually measured values for the electromagnetic thrust force "Fsol" and the elastic restoring force "Fel", in the similar manner to the reference I-P characteristic "IP0". Accordingly, it is possible to exactly calculate the stroke-response characteristic "SP" based on the thrust-force correlation "TC" and the restoring-force correlation "RC". And then, it becomes possible to increase the accuracy for setting the command-response characteristic "IP", which is obtained based on the estimated values for the overlapping length "ΣL" as well as the clearance width "ΔCL".

Second Embodiment

Figure 18:
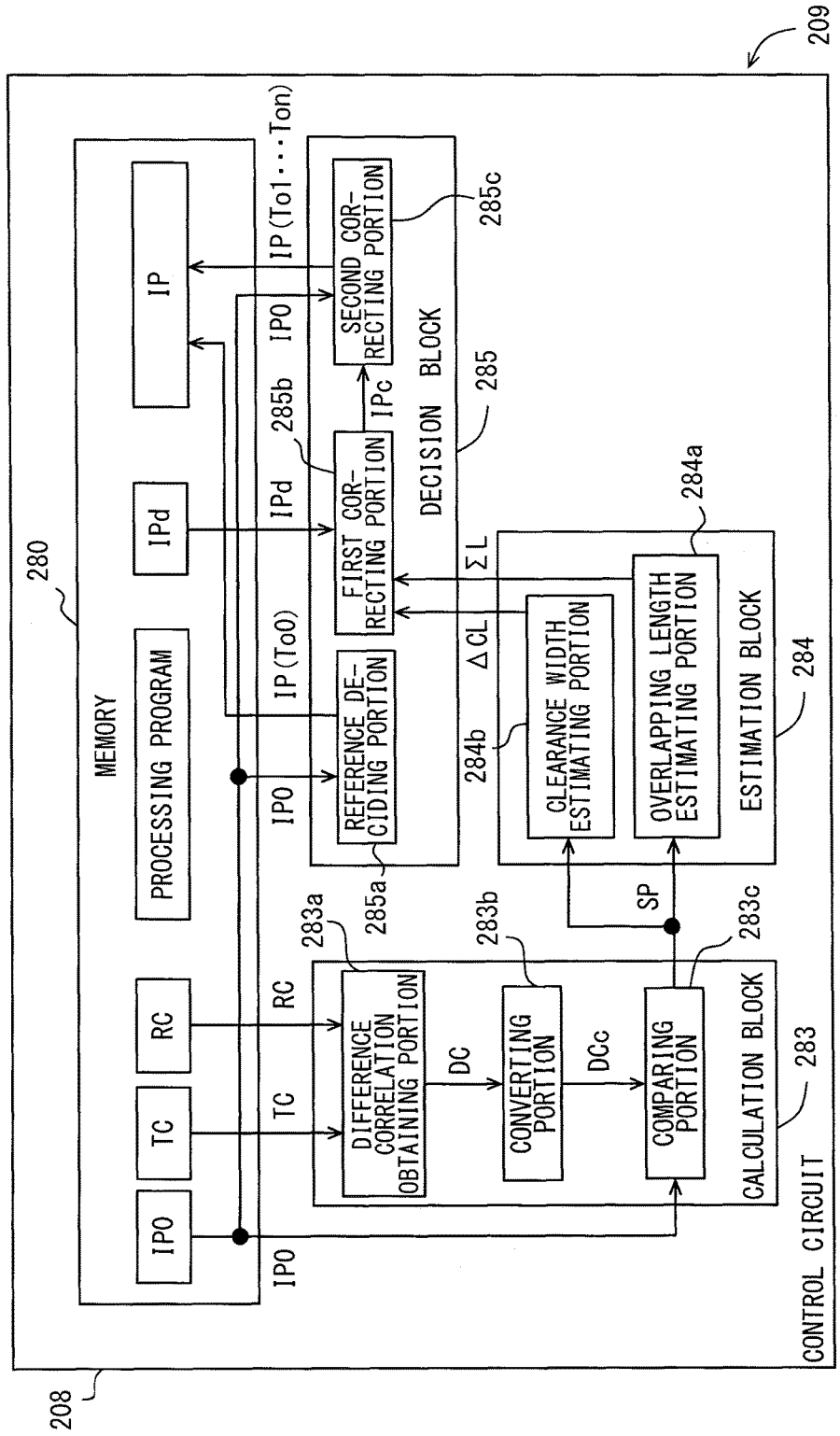
FIG. 18 is a block diagram showing a control circuit of an oil pressure control device according to a second embodiment of the present disclosure.

As shown in FIG. 18, a second embodiment of the present disclosure is a modification of the first embodiment. According to a method for setting the command-response characteristic "IP", the thrust-force correlation "TC" and the restoring-force correlation "RC" actually measured in the correlation measurement step S101, the reference I-P characteristic "IP0" actually measured in the reference measurement step S102, and the design characteristic "IPd" used in the decision step S105 are memorized in a memory device 280 of a control circuit 208. A process for memorizing the above data into the memory device 280 (also referred to as a reference memory device 280) is carried out before an oil pressure control apparatus 209 is installed in the vehicle, in a similar manner to the method of installing the command-response characteristic "IP" for each oil temperature "To" in the first embodiment. The memory device 280 is composed of, for example, one or multiple memory media, such as, EEPROM or the like.

In addition, according to the method for setting the command-response characteristic "IP" of the second embodiment, the calculation step S103, the estimation step S104 and the decision step S105 are carried out by an automatic processing of the control circuit 208, after the above data (the thrust-force correlation "TC", the restoring-force correlation "RC", the reference I-P characteristic "IP0" and the design characteristic "IPd") are memorized in the memory device 280, for example, when the oil pressure control apparatus 209 is installed in the vehicle. More exactly, a calculation block 283 for carrying out the calculation step S103, an estimation block 284 for carrying out the estimation step S104 and a decision block 285 for carrying out the decision step S105 are functionally constructed, so that respective processes of the steps S103 to S105 are carried out in accordance with a processing program memorized in the memory 280 in advance.

The calculation block 283 (a calculation portion) is composed of a circuit portion 283a for obtaining the difference-force correlation "DC", a circuit portion 283b for converting the difference-force correlation "DC" into the conversion correlation "DCc" and a circuit portion 283c for comparing the conversion correlation "DCc" with the reference I-P characteristic "IP0".

The circuit portion 283a works as "a difference-force correlation calculating portion" for carrying out the difference-force correlation calculating step S103a. Namely, the circuit portion 283a calculates the difference-force correlation "DC" based on the thrust-force correlation "TC" and the restoring-force correlation "RC", which are memorized in the memory device 280.

The circuit portion 283b works as "a converting portion" for carrying out the converting step S103b. Namely, the circuit portion 283b converts the difference-force correlation "DC" calculated by the circuit portion 283a into the conversion correlation "DCc".

The circuit portion 283c works as "a comparing portion" for carrying out the comparing step S103c. Namely, the circuit portion 283b compares the conversion correlation "DCc" obtained by the circuit portion 283b with the reference I-P characteristic "IP0" memorized in the memory device 280. As a result, the circuit portion 283c calculates the stroke-response characteristic "SP".

The estimation block 284 (an estimation portion) is composed of a circuit portion 284a for estimating the overlapping length "ΣL" and a circuit portion 284b for estimating the clearance width "ΔCL".

The circuit portion 284a works as "an overlap-length estimating portion" for carrying out the overlap-length estimating step S104a. Namely, the circuit portion 284a estimates the overlapping length "ΣL" based on the stroke-response characteristic "SP" calculated by the circuit portion 283c.

The circuit portion 284b works as "a clearance-width estimating portion" for carrying out the clearance-width estimating step S104b. Namely, the circuit portion 284b estimates the clearance width "ΔCL" based on the stroke-response characteristic "SP" calculated by the circuit portion 283c.

The decision block 285 (a decision portion) is composed of a circuit portion 285a for deciding the reference, a circuit portion 285b of a first correcting portion and a circuit portion 285c of a second correcting portion.

The circuit portion 285a works as "a reference deciding portion" for carrying out the reference deciding step S105a. Namely, the circuit portion 285a decides the reference I-P characteristic "IP0" memorized in the memory device 280 as the characteristic at the reference oil temperature "TOO".

The circuit portion 285b works as "the first correcting portion" for carrying out the first correcting step S105b. Namely, the circuit portion 285b corrects the design characteristic "IPd" memorized in the memory device 280 for each oil temperature "To" based on the overlapping length "ΣL" and the clearance width "ΔCL", which are respectively estimated by the circuit portions 284a and 284b. Accordingly, the circuit portion 285b calculates the corrected characteristic "IPc" for each oil temperature "To".

The circuit portion 285c works as "the second correcting portion" for carrying out the second correcting step S105c. Namely, the circuit portion 285c corrects the corrected characteristics "IPc" at the oil temperatures other than the reference oil temperatures "To0", which are calculated by the first correcting portion 285b, based on the corrected characteristic "IPc" at the reference oil temperature "To0" calculated by the first correcting portion 285b and the reference I-P characteristic "IP0" memorized in the memory device 280. Accordingly, the circuit portion 285c decides the command-response characteristics "IP" for each oil temperature "To" other than the reference oil temperature "To0".

According to the second embodiment, the command-response characteristics "IP" for each oil temperature "To", as decided above, are automatically memorized by the decision block 285 into the memory device 280. Since, according to the second embodiment, a part of the steps of the first embodiment is realized by the automatic processing as the function of the control circuit 208, it is possible to increase productivity for manufacturing the oil pressure control apparatus.

The present disclosure should not be limited to the above explained embodiments. The present disclosure can be modified in various manners without departing from a spirit of the present disclosure.

(M1) For example, in the first and/or the second embodiments, an order for carrying out the correlation measurement step S101 and an order for carrying out the reference measurement step S102 may be exchanged with each other.

(M2) In addition, in the correlation measurement step S101 of the first and/or the second embodiments, an order for carrying out the thrust-force correlation measuring step S101a and an order for carrying out the restoring-force correlation measuring step S101b may be exchanged with each other.

(M3) In the first and/or the second embodiments, the thrust-force correlation measuring step S101a may be eliminated from the correlation measurement step S101. Instead, a thrust-force correlation "TC", which can be obtained in advance based on a center value of tolerance, for example, when assuming the tolerance in designing, can be used for calculating the stroke-response characteristic "SP".

(M4) In addition, in the first and/or the second embodiments, the restoring-force correlation measuring step S101b may be eliminated from the correlation measurement step S101. Instead, a restoring-force correlation "RC", which can be obtained in advance based on a center value of tolerance, for example, when assuming the tolerance in designing, can be used for calculating the stroke-response characteristic "SP".

(M5) In the restoring-force correlation measuring step S101b of the correlation measurement step S101 for the first and/or the second embodiments, the restoring-force correlation "RC" may be obtained based on actually measured values of the elastic restoring force "Fel" for each stroke position "S".

(M6) In the first and/or the second embodiments, more exactly, in the converting step S103b of the calculation step S103, the output oil pressure "Po" of the reference I-P characteristic "IP0" actually measured in the reference measurement step S102 may be converted into the difference force "ΔF" in accordance with the equation 3. In this case, the difference-force correlation "DC" obtained by the difference-force correlation calculating step S103a and the reference I-P characteristic "IP0" obtained by the converting step S103b are compared with each other in the comparing step S103c, to thereby calculate the stroke-response characteristic "SP".

(M7) In the first and/or the second embodiments, the overlapping length "ΣL" may be estimated based on a physical amount other than the length of the land-overlap range "OL" and the length of the notch communication range "NC" of the stroke-response characteristic "SP".

(M8) In addition, in the first and/or the second embodiments, the clearance width "ΔCL" may be estimated based on a physical amount other than the gradient "θ" which is the change rate of the stroke-response characteristic "SP".

(M9) A linear solenoid valve of a normally-opened type may be used for the oil pressure control valve 7 in the first and/or the second embodiments.

(M10) The oil pressure control apparatus 9 or 209 of the first and/or the second embodiment may be modified, so that such a modified apparatus may be used for controlling working oil of any oil pressure control apparatus other than the automatic transmission apparatus 1.

(M11) In a case that the present disclosure is applied to the fluid pressure control apparatus 9 (or 209) having the oil pressure control valve 7 without the elastic member 30, the stroke-response characteristic "SP" may be calculated based on only the thrust-force correlation "TC". In this case, the electromagnetic thrust force "Fsol" of the thrust-force correlation "TC" may be converted into the output oil pressure "Po", which is then compared with the reference I-P characteristic "IP0" actually measured, in order to calculate the stroke-response characteristic "SP".

What is claimed is:

1. In an oil pressure control apparatus, which comprises;
a sleeve of a cylindrical shape having an inlet port into which working oil is inputted, an outlet port from which the working oil is outputted and a discharge port from which a part of the working oil passing from the inlet port to the outlet port is discharged, wherein the inlet port, the outlet port and the discharge port are formed in a cylindrical wall of the sleeve in this order in a spring-biasing direction;
a spool movably accommodated in the sleeve and having an inlet-side land and a discharge-side land in this order in the spring-biasing direction, so that an outer peripheral surface of each land of the spool is in a sliding contact with an inner peripheral surface of the cylindrical wall of the sleeve, wherein an inlet-side interfacial surface is formed at an inlet-side overlapping area between the inlet port and the outlet port, so that the outer peripheral surface of the inlet-side land of the spool and the inner peripheral surface of the cylindrical wall are overlapped with each other in a radial direction of the sleeve, and wherein a discharge-side interfacial surface is formed at a discharge-side overlapping area between the outlet port and the discharge port, so that the outer peripheral surface of the discharge-side land of the spool and the inner peripheral surface of the cylindrical wall are overlapped with each other in the radial direction of the sleeve;
a solenoid provided at one of axial ends of the sleeve for generating an electromagnetic thrust force in accordance with a command value of electric power supplied to the solenoid, so that the electromagnetic thrust force is applied to one of axial ends of the spool in an axial direction of the sleeve for biasing the spool in a direction opposite to the spring-biasing direction; and
an elastic member provided at the other of the axial ends of the sleeve for generating an elastic restoring force in accordance with a stroke position of the spool with respect to the sleeve, so that the elastic restoring force is applied to the other of the axial ends of the spool in the axial direction of the sleeve for biasing the spool in the spring-biasing direction toward the solenoid, wherein the spool is reciprocated in the sleeve depending on a balance of the electromagnetic thrust force and the elastic restoring force in the axial direction, so as to adjust an amount of the working oil to be discharged from the discharge port to thereby control an output oil pressure of the working oil outputted from the outlet port, a method for setting a characteristic of the output oil pressure with respect to the command value as a command-response characteristic comprises;

a first step for actually measuring the command-response characteristic of the output oil pressure at a reference oil temperature, wherein the command-response characteristic actually measured at the reference oil temperature is treated as a reference I-P characteristic;

a second step for calculating a stroke-response characteristic, which is a characteristic of the output oil pressure with respect to the stroke position of the spool, wherein a calculation of the second step is carried out based on the reference I-P characteristic actually measured in the first step, a thrust-force correlation which is a correlation of the electromagnetic thrust force with respect to the stroke position of the spool for each command value, and a restoring-force correlation which is a correlation of the elastic restoring force with respect to the stroke position of the spool;

a third step for estimating an overlapping length and a clearance width based on the stroke-response characteristic calculated in the second step, wherein the overlapping length is a total length of the inlet-side overlapping area formed in the inlet-side interfacial surface and the discharge-side overlapping area formed in the discharge-side interfacial surface in the axial direction of the sleeve, and wherein the clearance width is a width of an inlet-side clearance and a discharge-side clearance each of which is respectively formed in the inlet-side interfacial surface and in the discharge-side interfacial surface in the radial direction of the sleeve; and a fourth step for deciding the command-response characteristic for each oil temperature based on the overlapping length and the clearance width each estimated in the third step as well as the reference I-P characteristic actually measured in the first step.

2. In the oil pressure control apparatus according to claim 1, wherein the spool has a feedback-side land on a side of the inlet-side land opposite to the discharge-side land in order to form a feedback-side oil chamber in the sleeve between the feedback-side land and the inlet-side land, and wherein the output oil pressure is feed-backed to the feedback-side oil chamber, so that a feedback force balancing with the electromagnetic thrust force and the elastic restoring force is applied to the spool, the second step of the method for setting the characteristic of the output oil pressure comprises;

a difference-force correlation calculating step for calculating a difference force between the electromagnetic thrust force and the elastic restoring force with respect to the stroke position of the spool and obtaining a correlation of the difference force for each command value as a difference-force correlation;

a converting step for converting the difference force of the difference-force correlation into a value of the output oil pressure, to thereby obtain a conversion correlation; and a comparing step for comparing the conversion correlation with the reference I-P characteristic actually measured in the first step, to thereby obtain the stroke-response characteristic.

3. In the oil pressure control apparatus according to claim 1, wherein the inlet-side interfacial surface is formed between the outer peripheral surface of the inlet-side land of the spool and the inner peripheral surface of the cylindrical wall, when the spool is in a predetermined stroke position for cutting off communication between the inlet port and the outlet port, so that the spool is in the sliding contact with the inner peripheral surface of the cylindrical wall via the inlet-side clearance formed in the inlet-side interfacial surface, wherein the discharge-side interfacial surface is formed between the outer peripheral surface of the discharge-side land of the spool and the inner peripheral surface of the cylindrical wall, when the spool is in another predetermined stroke position for cutting off communication of the discharge port from the outlet port, so that the spool is in the sliding contact with the inner peripheral surface of the cylindrical wall via the discharge-side clearance formed in the discharge-side interfacial surface, and wherein a notched portion is formed in the inlet-side land on its axial side to the discharge-side land, the third step of the method for setting the characteristic of the output oil pressure comprises;

an overlap-length estimating step for estimating the overlapping length based on a distance of a land-overlap range and a distance of a notch communication range by use of the stroke-response characteristic calculated in the second step; and a clearance-width estimating step for estimating the clearance width based on a change rate of the output oil pressure in the notch communication range by use of the stroke-response characteristic calculated in the second step, wherein the land-overlap range corresponds to an axial distance of a range of the stroke position, in which the notched portion overlaps with the inner peripheral surface of the cylindrical wall in the radial direction of the sleeve, the inlet-side land is in the sliding contact with the inner peripheral surface of the cylindrical wall of the inlet-side overlapping area and the discharge-side land is in the sliding contact with the inner peripheral surface of the cylindrical wall of the discharge-side overlapping area, and wherein the notch communication range corresponds to an axial distance of a range of the stroke position, in which the notched portion is partly separated from the inner peripheral surface of the cylindrical wall in the axial direction so that the inlet port is communicated to the outlet port through the notched portion, the inlet-side land is in the sliding contact with the inner peripheral surface of the cylindrical wall of the discharge-side overlapping area and the discharge-side land is in the sliding contact with the inner peripheral surface of the cylindrical wall of the discharge-side overlapping area.

4. In the oil pressure control apparatus according to claim 1,
the method for setting the characteristic of the output oil pressure comprises;
a correlation measurement step for obtaining each of the thrust-force correlation and the restoring-force correlation based on actually measured values,
wherein the correlation measurement step is carried out before the second step.

5. An oil pressure control apparatus comprises;
a sleeve of a cylindrical shape having an inlet port into which working oil is inputted, an outlet port from which the working oil is outputted and a discharge port from which a part of the working oil passing from the inlet port to the outlet port is discharged, wherein the inlet port, the outlet port and the discharge port are formed in a cylindrical wall of the sleeve in this order in a spring-biasing direction;
a spool movably accommodated in the sleeve and having an inlet-side land and a discharge-side land in this order in the spring-biasing direction, so that an outer peripheral surface of each land of the spool is in a sliding contact with an inner peripheral surface of the cylindrical wall of the sleeve, wherein an inlet-side interfacial surface is formed at an inlet-side overlapping area between the inlet port and the outlet port, so that the outer peripheral surface of the inlet-side land of the spool and the inner peripheral surface of the cylindrical wall are overlapped with each other in a radial direction of the sleeve, and wherein a discharge-side interfacial surface is formed at a discharge-side overlapping area between the outlet port and the discharge port, so that the outer peripheral surface of the discharge-side land of the spool and the inner peripheral surface of the cylindrical wall are overlapped with each other in the radial direction of the sleeve;
a solenoid provided at one of axial ends of the sleeve for generating an electromagnetic thrust force in accordance with a command value of electric power supplied to the solenoid, so that the electromagnetic thrust force is applied to one of axial ends of the spool in an axial direction of the sleeve for biasing the spool in a direction opposite to the spring-biasing direction;
an elastic member provided at the other of the axial ends of the sleeve for generating an elastic restoring force in accordance with a stroke position of the spool with respect to the sleeve, so that the elastic restoring force is applied to the other of the axial ends of the spool in the axial direction of the sleeve for biasing the spool in the spring-biasing direction toward the solenoid,
wherein the spool is reciprocated in the sleeve depending on a balance of the electromagnetic thrust force and the elastic restoring force in the axial direction, so as to adjust an amount of the working oil to be discharged from the discharge port to thereby control an output oil pressure of the working oil outputted from the outlet port; and
an electronic control unit for controlling supply of the electric power to the solenoid, wherein the electronic control unit comprises;
a reference memorizing portion for memorizing a reference I-P characteristic, which is a command-response characteristic of the output oil pressure with respect to the command value and actually measured at a reference oil temperature;
a calculation portion for calculating a stroke-response characteristic of the output oil pressure with respect to the stroke position of the spool, based on the reference I-P characteristic memorized in the reference memorizing portion, a thrust-force correlation which is a correlation of the electromagnetic thrust force with respect to the stroke position for each command value, and a restoring-force correlation which is a correlation of the elastic restoring force with respect to the stroke position;
an estimation portion for estimating an overlapping length and a clearance width based on the stroke-response characteristic calculated in the calculation portion, wherein the overlapping length is a total length of the inlet-side overlapping area formed in the inlet-side interfacial surface and the discharge-side overlapping area formed in the discharge-side interfacial surface in the axial direction of the sleeve, and wherein the clearance width is a width of an inlet-side clearance and a discharge-side clearance each of which is respectively formed in the inlet-side interfacial surface and in the discharge-side interfacial surface in the radial direction of the sleeve; and
a decision portion for deciding the command-response characteristic for each oil temperature based on the overlapping length and the clearance width each estimated in the estimation portion as well as the reference I-P characteristic memorized in the reference memorizing portion.

6. The oil pressure control apparatus according to claim 5,
wherein the spool has a feedback-side land on a side of the inlet-side land opposite to the discharge-side land in order to form a feedback-side oil chamber in the sleeve between the feedback-side land and the inlet-side land, and
wherein the output oil pressure is feed-backed to the feedback-side oil chamber, so that a feedback force balancing with the electromagnetic thrust force and the elastic restoring force is applied to the spool, and
wherein the calculation portion comprises;
a difference-force correlation calculating portion for calculating a difference force between the electromagnetic thrust force and the elastic restoring force with respect to the stroke position of the spool and calculating a correlation of the difference force for each command value as a difference-force correlation;
a converting portion for converting the difference force of the difference-force correlation into a value for the output oil pressure, to thereby obtain a conversion correlation; and
a comparing portion for comparing the conversion correlation with the reference I-P characteristic memorized in the reference memorizing portion, to thereby obtain the stroke-response characteristic.

7. The oil pressure control apparatus according to claim 5,
wherein the inlet-side interfacial surface is formed between the outer peripheral surface of the inlet-side land of the spool and the inner peripheral surface of the cylindrical wall, when the spool is in a predetermined stroke position for cutting off communication between the inlet port and the outlet port, so that the spool is in the sliding contact with the inner peripheral surface of the cylindrical wall via the inlet-side clearance formed in the inlet-side interfacial surface,
wherein the discharge-side interfacial surface is formed between the outer peripheral surface of the discharge-side land of the spool and the inner peripheral surface of the cylindrical wall, when the spool is in another predetermined stroke position for cutting off communication of the discharge port from the outlet port, so that the spool is in the sliding contact with the inner peripheral surface of the cylindrical wall via the discharge-side clearance formed in the discharge-side interfacial surface, wherein a notched portion is formed in the inlet-side land on its axial side to the discharge-side land, and wherein the estimation portion comprises;

an overlap-length estimating portion for estimating the overlapping length based on a distance of a land-overlap range and a distance of a notch communication range by use of the stroke-response characteristic calculated in the calculation portion; and a clearance-width estimating portion for estimating the clearance width based on a change rate of the output oil pressure in the notch communication range by use of the stroke-response characteristic calculated in the calculation portion, wherein the land-overlap range corresponds to an axial distance of a range of the stroke position, in which the notched portion overlaps with the inner peripheral surface of the cylindrical wall in the radial direction of the sleeve, the inlet-side land is in the sliding contact with the inner peripheral surface of the cylindrical wall of the inlet-side overlapping area and the discharge-side land is in the sliding contact with the inner peripheral surface of the cylindrical wall of the discharge-side overlapping area, and wherein the notch communication range corresponds to an axial distance of a range of the stroke position, in which the notched portion is partly separated from the inner peripheral surface of the cylindrical wall in the axial direction so that the inlet port is communicated to the outlet port through the notched portion, the inlet-side land is in the sliding contact with the inner peripheral surface of the cylindrical wall of the discharge-side overlapping area and the discharge-side land is in the sliding contact with the inner peripheral surface of the cylindrical wall of the discharge-side overlapping area.

* * * * *